United States Patent
Jouhikainen et al.

(10) Patent No.: US 10,650,395 B2
(45) Date of Patent: May 12, 2020

(54) SYSTEMS AND METHODS FOR PROVIDING SOCIAL DISCOVERY RELATIONSHIPS

(71) Applicant: Capital One Services, LLC, McLean, VA (US)

(72) Inventors: Hannes M. Jouhikainen, Arlington, VA (US); Luke A. Hammock, Washington, DC (US); Janusz M. Niczyporuk, Vienna, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/351,148

(22) Filed: Mar. 12, 2019

(65) Prior Publication Data

US 2019/0213609 A1    Jul. 11, 2019

Related U.S. Application Data

(63) Continuation of application No. 14/089,218, filed on Nov. 25, 2013, now Pat. No. 10,235,682.

(60) Provisional application No. 61/776,214, filed on Mar. 11, 2013.

(51) Int. Cl.
G06Q 30/02    (2012.01)

(52) U.S. Cl.
CPC ................ *G06Q 30/0201* (2013.01)

(58) Field of Classification Search
CPC .................................................. G06Q 30/0201
See application file for complete search history.

(56) References Cited

U.S. PATENT DOCUMENTS

| 8,700,526 | B1* | 4/2014 | Cozens | G06Q 20/223 |
| | | | | 705/39 |
| 2011/0028160 | A1 | 2/2011 | Roeding | |
| 2011/0093324 | A1* | 4/2011 | Fordyce, III | G06Q 20/10 |
| | | | | 705/14.27 |
| 2012/0036015 | A1 | 2/2012 | Sheikh | |
| 2012/0239479 | A1 | 9/2012 | Amaro | |
| 2012/0253932 | A1* | 10/2012 | Kim | G06Q 30/02 |
| | | | | 705/14.53 |
| 2012/0323663 | A1 | 12/2012 | Leach | |
| 2013/0006805 | A1* | 1/2013 | Ulli | G06Q 30/06 |
| | | | | 705/26.8 |
| 2013/0006816 | A1 | 1/2013 | Nuzzi | |
| 2013/0041824 | A1 | 2/2013 | Gupta | |

(Continued)

*Primary Examiner* — Sujay Koneru
(74) *Attorney, Agent, or Firm* — Finnegan, Henderson, Farabow, Garrett & Dunner, LLP

(57) ABSTRACT

The disclosed embodiments include methods and systems for providing social discovery service operations. In one embodiment, a system for providing a social discovery service is disclosed. The system may be configured to receive transaction data relating to one or more purchase transactions involving one or more merchants and one or more consumers. The system may also be configured to receive product data identifying one or more products included in the one or more purchase transactions. The system may also receive location data associated with the one or more purchase transactions. Based on the transaction data, location data, and the product data, the system may be configured to generate one or more social discovery graphs. Further, the system may be configured to perform one or more social discovery operations based on the one or more social discovery graphs.

12 Claims, 17 Drawing Sheets

(56) References Cited

U.S. PATENT DOCUMENTS

| | | |
|---|---|---|
| 2013/0110624 A1 | 5/2013 | Mitrovic |
| 2013/0204701 A1 | 8/2013 | Calafiore |
| 2014/0025473 A1* | 1/2014 | Cohen ................ G06Q 30/0207 |
| | | 705/14.28 |
| 2014/0040157 A1* | 2/2014 | Cohen .................... G06Q 40/06 |
| | | 705/329 |
| 2014/0052584 A1 | 2/2014 | Gershon |
| 2014/0089130 A1 | 3/2014 | Batra |
| 2014/0222636 A1 | 8/2014 | Cheng |
| 2014/0244375 A1* | 8/2014 | Kim .................. G06Q 30/0226 |
| | | 705/14.27 |
| 2014/0257922 A1 | 9/2014 | Jouhikainen |
| 2015/0206211 A1* | 7/2015 | Stoll ................ G06Q 30/0601 |
| | | 705/26.1 |

\* cited by examiner

SYSTEMS AND METHODS FOR PROVIDING SOCIAL DISCOVERY RELATIONSHIPS

CROSS-REFERENCE TO RELATED APPLICATIONS

This application is a continuation of U.S. patent application Ser. No. 14/089,218, filed Nov. 25, 2013 (now allowed), which claims priority under 35 U.S.C. § 119 to U.S. provisional patent application No. 61/776,214, filed on Mar. 11, 2013, and entitled "Systems and Methods for Providing Social Discovery Relationships." The disclosures of the above-identified applications are expressly incorporated herein by reference in their entirety.

TECHNICAL FIELD

The disclosed embodiments relate generally to account management technologies and, in particular, to methods and systems for providing social discovery relationships.

BACKGROUND

New digital media and technologies are making it easier for people to form and expand their social networks. With today's ever-increasing connectedness and prevalence of mobile devices, people are actively making use of social networking services as a way to form and maintain relationships. A first generation of social networks, based on connecting with friends and acquaintances in a location-agnostic way, has gained almost ubiquitous popularity with solutions such as Facebook® and LinkedIn® leading the way. A second generation of networks, building on the premise of location based social discovery, has recently gained increasing popularity as GPS-enabled smartphones become more prevalent. However, while the first generation of social networks enabled consumers to connect with people they already know, and the second generation has made location-based social discovery possible, consumers still face difficulty in using these services to interact with and meet new people with similar interests and ways of life.

For example, Foursquare® provides a platform for social discovery based on a shared location and a profile filled into the service. Other similar location-based applications, utilizing real-time GPS data instead of "check-ins," have also emerged enabling people to meet others nearby that share interests or ways of life (e.g., professional interests and affiliations, activities, social habits, preferences, etc.). A challenge with these services, however, is the reliance on self-reported preferences, habits, and characteristics. Because a person's perception and description of self can diverge considerably from actual habits and lifestyle, and often focuses mainly on aspirations, forming social ties via these services can be difficult.

SUMMARY

The disclosed embodiments provide methods and systems for providing social discovery processes. In one example, certain disclosed embodiments include system and processes that may provide more realistic indicators of shared interests and social compatibility based on actual consumption and lifestyle habits of consumers. By combining real-time location-data with transaction data, such as, for example, credit and debit card purchases (which may be complemented by SKU data from participating merchants that may grant access to this data), certain disclosed embodiments may build a holistic consumption and lifestyle profile of a consumer, and help people discover others with a similar profile in real-time.

The disclosed embodiments may provide services that are valuable to both consumers and merchants. For example, aspects of the disclosed embodiments may provide social experience services that make shopping more interactive and fun for consumers. For merchants, aspects of the disclosed embodiments may create opportunities to build strong customer communities, attract new highly engaged customers, and build a "shopping graph," where customers are not only indentified based on their consumption patterns, but also based on their ties to other consumers and their habits. The disclosed embodiments may also allow merchants to use dynamic data relating to shopping habits and social connections of consumers to identify and target opinion-leaders in order to create a broader marketing and business opportunity ripple-effect through them.

The disclosed embodiments also provide other socially-based features, such as gifting, Peer-to-Peer (P2P) payments, group buying, group charity giving, and crowdfunding. For example, for gifting, certain disclosed embodiments provide community features that may make it easier for a consumer to decide on relevant gift ideas. For P2P payments, certain disclosed embodiments provide mechanisms that may increases trust between consumers or other entities to facilitate payment. For group buying, certain disclosed embodiments may provide information and services that identify a more relevant audience for merchants. Moreover, for charity giving and crowdfunding, certain disclosed embodiments may provide information that identifies people with similar interests, investment preferences, and other charitable or crowdfunding characteristics.

Other aspects of the disclosed embodiments are set forth below in this disclosure. For example, the disclosed embodiments include a system for providing a social discovery service including one or more memory devices storing software instructions and one or more processors configured to execute the software instructions to receive transaction data relating to one or more purchase transactions involving one or more merchants and one or more consumers. The one or more processors may also receive product data identifying one or more products included in the one or more purchase transactions, and receive location data associated with the one or more purchase transaction. The one or more processors may also generate one or more social discovery graphs based on the transaction data, location data, and the product data, and perform one or more social discovery operations based on the one or more social discovery graphs.

The disclosed embodiments may also include a method for providing social discovery service operations. The method may include, for example, receiving transaction data relating to one or more purchase transactions involving one or more merchants and one or more consumers, and receiving product data identifying one or more products included in the one or more purchase transactions. The method may further include receiving location data associated with the one or more purchase transaction. In one aspect, the method may also include generating one or more social discovery graphs based on the transaction data; location data, and the product data, and performing one or more social discovery operations based on the one or more social discovery graphs.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

DETAILED DESCRIPTION

Figure 1:
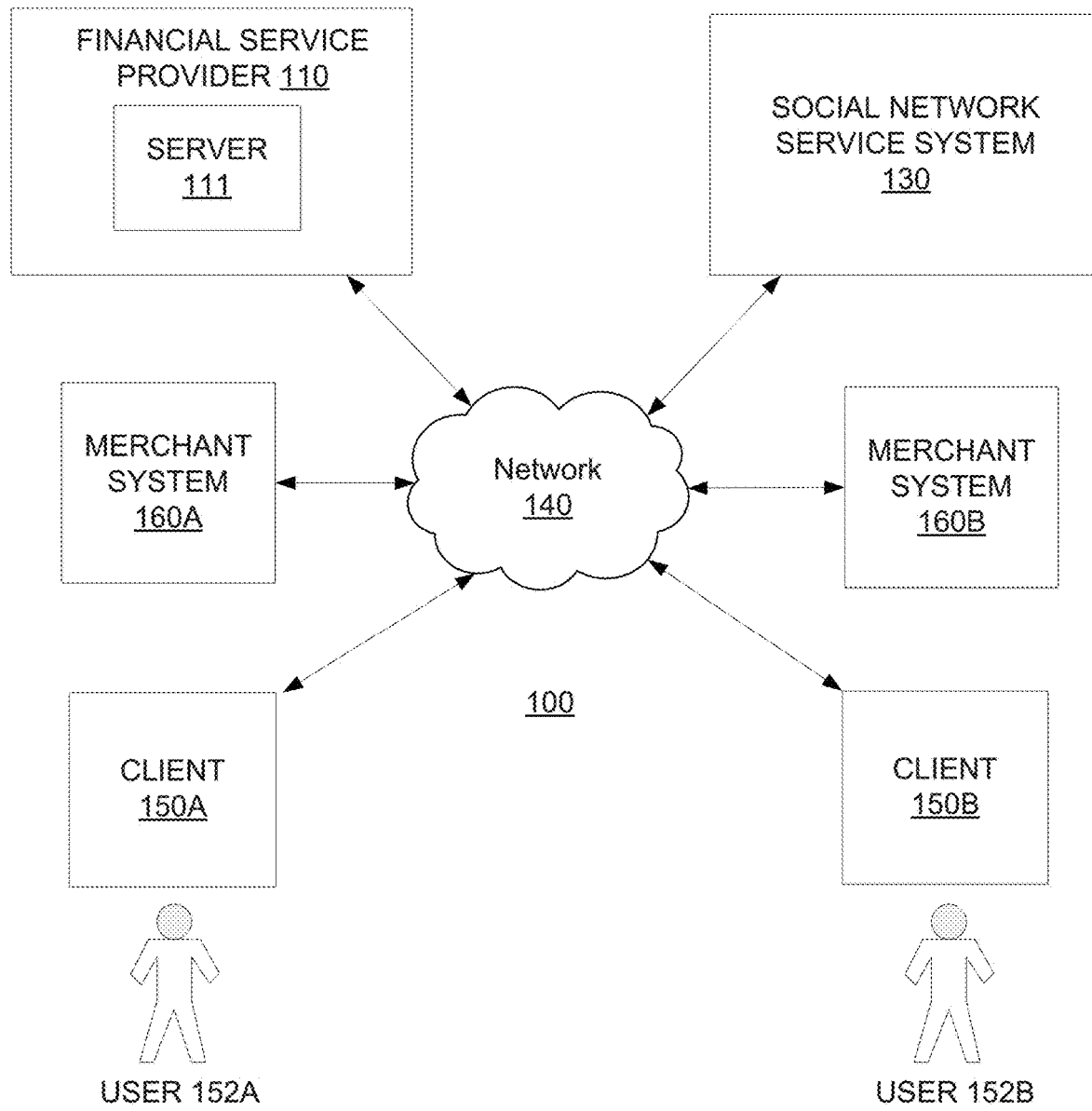
FIG. 1 is a block diagram of an exemplary system consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

The disclosed embodiments include methods, systems, and articles of manufacture that are configured to provide, for example, social discovery operations. For example, in certain embodiments, a user may register with a social discovery service to request and receive social discovery information. In certain embodiments, a financial service provider, such as a credit card company, bank, lender, etc., may provide the social discovery service via a social network configured to operate using transaction data relating to financial service accounts provided by the financial service provider. In other embodiments, the social discovery service may be built upon a third-party social network (e.g., Facebook®, Twitter®, Yelp®, etc.) that is enhanced with financial transaction data provided by one or more financial service providers and/or merchants. The disclosed embodiments may be configured to track purchases made by users based on, for example, merchant categories, time of purchase, location of purchase, and other transaction parameters. Based on the transaction data and social network related information related to the purchases, the disclosed embodiments may generate consumer profiles for the users. The disclosed embodiments may use the consumer profiles to provide social discovery operations for consumers, merchants, or other entities.

For example, in one embodiment, a social discovery service is provided that allows a user to request and receive information about other users with similar purchasing patterns who may be within a determined distance of the requesting user (e.g., other consumers in the same store, mall, plaza, block, etc.). In another embodiment, the social discovery service may allow users to connect and communicate based on similarities in shopping habits or purchasing patterns. The disclosed embodiments may provide interfaces that allow a user to share shopping information, ideas, provide product feedback, etc. to other users in a social community that the user belongs to, with merchants, or to the general public. The social discovery service may also provide mechanism to allow users to build social communities for group buying, group charity giving, crowdfunding, exchange gift ideas for a common known person, etc. The disclosed embodiments may also provide mechanisms that enable merchants to provide product information relating to purchases by consumers (e.g., SKU data, etc.). In one aspect, merchants who register for the social discovery service and provide product data may receive information relating to consumer profiles, such as shopping habits, the presence of consumers with certain shopping habits in certain store locations, etc. The disclosed embodiments provide other aspects that are explained below.

FIG. 1 is a block diagram of an exemplary system 100 for performing one or more operations consistent with the disclosed embodiments. In one embodiment, system 100 may include one or more financial service providers 110, social network service system 130, one or more clients 150 (exemplary clients 150A and 150B shown), one or more merchant systems 160 (exemplary merchant systems 160A and 160B shown), and network 140. The components and arrangement of the components included in system 100 may vary. Thus, system 100 may further include other components that perform or assist in the performance of one or more processes consistent with the disclosed embodiments.

Financial service provider 110 may be an entity that provides financial services. For example, financial service provider 110 may be a bank, credit card issuer, or other type of financial service entity that generates, provides, manages, and/or maintains financial service accounts for one or more users. Financial service accounts may include, for example, credit card accounts, loan accounts, checking accounts, savings accounts, reward accounts, and any other types of financial service account known to those skilled in the art. Financial service provider 110 may include infrastructure and components that are configured to generate and provide financial service accounts such as credit card accounts, checking accounts, debit card accounts, lines of credit, and the like.

In one embodiment, financial service provider 110 may include one or more computing systems that are configured to execute software instructions stored on one or more memory devices to perform one or more operations consistent with the disclosed embodiments. In one embodiment, financial service provider 110 may include server 111. Server 111 may be one or more computing devices configured to execute software instructions stored in memory to perform one or more processes consistent with the disclosed embodiments. For example, server 111 may include one or more memory device(s) storing data and software instructions and one or more processor(s) configured to use the data and execute the software instructions to perform server-based functions and operations known to those skilled in the art. Server 111 may also be configured to execute stored software instructions to perform social discovery service operations consistent with the disclosed embodiments. Server 111 may be a general purpose computer, a mainframe computer, or any combination of these components. In certain embodiments, server 111 (or a system including server 111) may be configured as a particular apparatus, system, and the like based on the storage, execution, and/or implementation of the software instructions that perform one or more operations consistent with the disclosed embodiments. Server 111 may be standalone, or it may be part of a subsystem, which may be part of a larger system. For example, server 111 may represent distributed servers that are remotely located and communicate over a network (e.g., network 140) or a dedicated network, such as a LAN, for financial service provider 110.

Server 111 may include or may connect to one or more storage devices configured to store data and/or software instructions used by one or more processors of server 111 to perform operations consistent with disclosed embodiments. For example, server 111 may include memory configured to store one or more software programs that performs several functions when executed by a processor. The disclosed embodiments are not limited to separate programs or computers configured to perform dedicated tasks. For example, server 111 may include memory that stores a single program or multiple programs. Additionally, server 111 may execute one or more programs located remotely from server 111. For example, server 111 may access one or more remote programs stored in memory included with a remote component that, when executed, perform operations consistent with the disclosed embodiments. In certain aspects, server 111 may include web server software that generates, maintains, and provides web site(s) that are accessible over network 140. In other aspects, financial server provider 110 may connect separate web server(s) or similar computing devices that generate, maintain, and provide web site(s) for financial service provider 110.

In certain aspects, a user may operate one or more components of financial service provider (e.g., server 111) to perform one or more operations consistent with the disclosed embodiments. In one aspect, such a user may be an employee of, or associated with, financial service provider 110 (e.g., someone authorized to use components of server 111 or perform processes for financial service provider 110). In other aspects, the user may not be an employee of, or otherwise is associated with financial service provider 110.

Social network service system 130 may be a computing system configured to provide social network services. In one embodiment, social network service system 130 may be related to an entity that provides social network services. For example, social network service system 130 may be a computing system provided by a social network service provider, such as, for example, Facebook®, Twitter®, LinkedIn®, etc. Social network service system 130 may include one or more computing devices (e.g., server(s)), memory storing data and/or software instructions (e.g., database(s), memory devices, etc.) and other known computing components. Social network service system 130 may be configured to communicate with one or more components of system 100, such as financial service provider 110, merchant systems 160, and/or clients 150. Social network service system 130 may be configured to provide a social network service that provides interface(s) accessible by users over a network (e.g., the Internet), relating to social network functions.

Merchant systems 160A and 160B may computing systems that are associated with business entities that provide goods and/or services, such as a retailer, grocery store, service provider (e.g., utilities, etc.), or any other type of entity that provides goods and/or services that consumers (e.g., user or business entities) may purchase. While system 100 is shown with two merchant systems 160A and 160B, the disclosed embodiments may be implemented in a system including only one merchant system 160 or two or more merchant systems 160. Further, a merchant system 160 is not limited to conducting business in any particular industry or field. For example, merchant system 160A may be a system associated with a company that provides semiconductor chips and merchant system 160B may be a company that supplies automobile parts.

Merchant system 160 may be associated with a merchant brick and mortar location(s) that a consumer (e.g., user 152) may physically visit and purchase goods and services. Such physical locations may include merchant system 160, which may include computing devices that perform financial service transactions with consumers (e.g., Point of Sale (POS) terminal(s), kiosks, etc.). Merchant system 160 may also include back and/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or service via known online or e-commerce type of solutions. For example, such a merchant may sell goods via a website using known online or e-commerce systems and solutions to market, sell, and process online transactions.

In one embodiment, merchant system 160 (e.g., 160A and 160B) may include one or more servers or other type of computer devices. The merchant system server(s) may be or more computing devices configured to execute software instructions stored in memory to perform one or more processes consistent with the disclosed embodiments. For example, merchant system 160 may include one or more memory device(s) storing data and software instructions and one or more processor(s) configured to use the data and execute the software instructions to perform server-based functions and operations known to those skilled in the art. Merchant system 160 may include server(s) that are configured to execute stored software instructions to perform operations associated with a merchant, including one or more processes associated with processing purchase transactions, generating transaction data, generating product data (e.g., SKU data) relating to purchase transactions, etc. Merchant system 160 may include one or more servers that may be a general purpose computer, a mainframe computer, or any combination of these components. In certain embodiments, merchant system 160 (or a system including merchant system 160) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a network (e.g., network 140) or a dedicated network, such as a LAN, for merchant 160.

In certain aspects, merchant system 160 may include one or more web servers that execute software that generates, maintains, and provides web site(s) for a respective merchant that is accessible over network 140. In other aspects, a merchant system 160 may connect separately to web server(s) or similar computing devices that generate, maintain, and provide web site(s) for a merchant.

In certain embodiments, one or more users may operate components associated with merchant system 160 to perform one or more processes consistent with the disclosed embodiments. For example, a user may access, use, and otherwise operate merchant system 160A to perform processes such as, purchase or sale transaction processes, forecasting processes, supply chain management processes, inventory management processes, accounting processes, and the like. A user may also access, use, and otherwise operate merchant system 160B to perform similar processes associated with the business for a merchant associated with merchant system 160B.

In one example, merchant system 160 may be configured to execute software instructions to provide transaction data and/or product data relating to purchase transactions to financial service provider 110 over network 140.

A client 150 (e.g., 150A and 150B) may be one or more computing devices configured to perform one or more operations consistent with certain disclosed embodiments. Client 150 may be a desktop computer, a laptop, a server, a mobile device (e.g., tablet, smart phone, etc.), and any other type of computing device. Client 150 may include one or more processors configured to execute software instructions stored in memory, such as memory included in client 150. Client 150 may include software that when executed by a processor performs known Internet-related communication and content display processes. For instance, client 150 may execute browser software that generates and displays interfaces including content on a display device included in, or connected to, client 150. Client 150 may be a mobile device that executes mobile device applications and/or mobile device communication software that allows client 150 to communicate with components over network 140, and generates and displays content in interfaces via a display device included in client 150. The disclosed embodiments are not limited to any particular configuration of client 150. For instance, client 150 may be a mobile device that stores and executes mobile applications that provide financial service related functions offered by financial service provider 110 and/or merchants 150A, 150B, such as a banking mobile application for checking balances, paying bills, etc. Client 150 may execute software instructions that also provide access to a social discovery service consistent with the disclosed embodiments. In certain embodiments, client 150 may be configured to execute software instructions relating to location services, such as GPS locations. For example, client 150 may be configured to determine a geographic location of client 150 (and associated user 152) and provide location data and time stamp data corresponding to the location data.

In one embodiment, a user 152 (e.g., 152A or 152B) may use client 150 to perform one or more operations consistent with the disclosed embodiments. In one aspect, user 152 may be a customer of financial service provider 110. For instance, financial service provider 110 may maintain a financial service account (e.g., credit card account) for user 152A that user 152A may use to purchase goods and/or services online or at brick and mortar locations associated with a merchant relating to merchant system 160A and/or 160B. In other embodiments, user 152 may be a potential customer of financial service provider 110 or may not be affiliated with financial service provider 110 from the user's perspective and/or the financial service provider 110's perspective.

Network 140 may be any type of network configured to provide communications between components of system 100. For example, network 100 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as links between financial service provider 110, merchants 160A and 160B, and social network system 130.

Figure 2A:
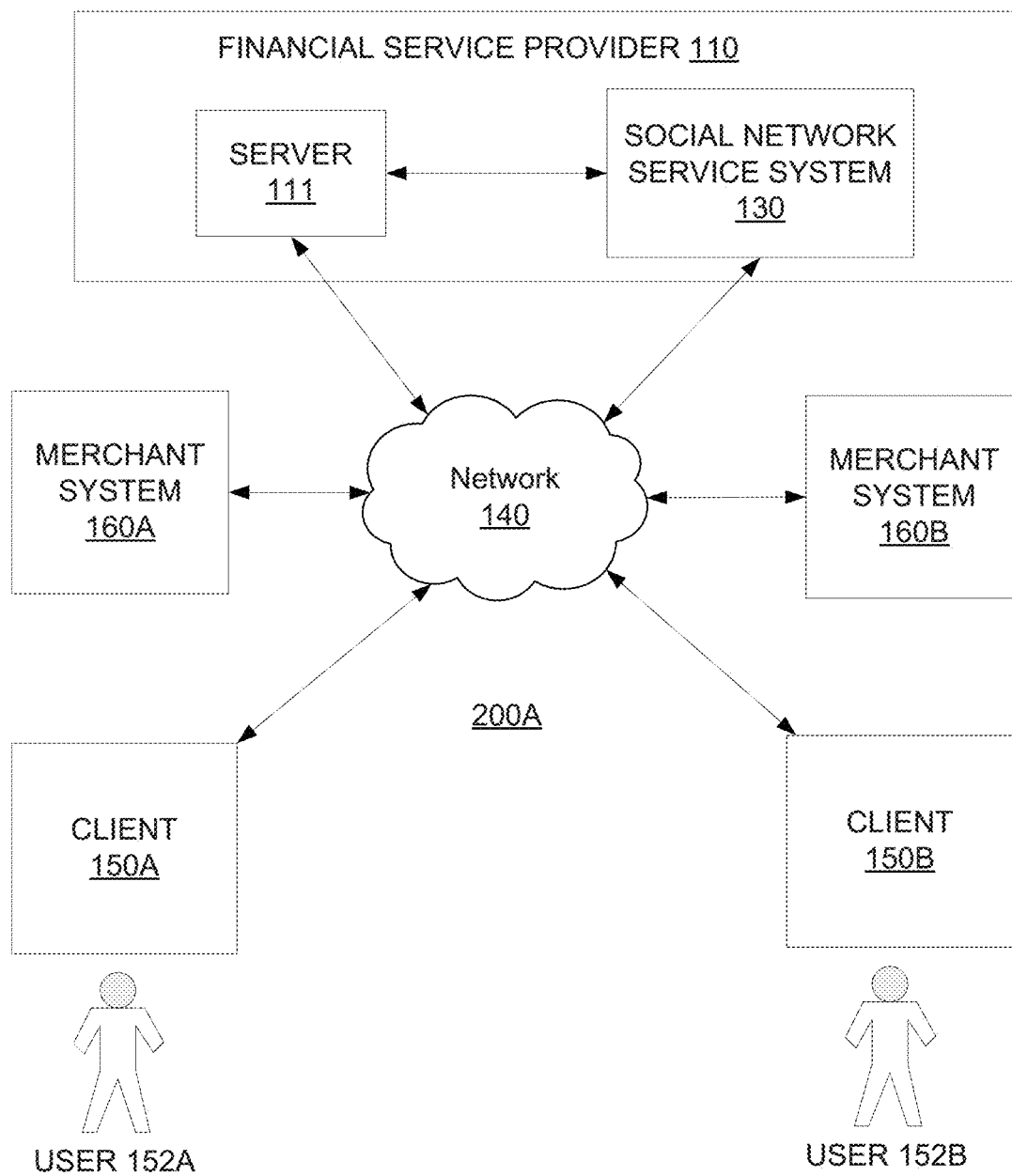
FIG. 2A is a block diagram of another exemplary system consistent with disclosed embodiments.

In certain embodiments, financial service provider 110 may be configured to provide social network services. For example, as shown in FIG. 2A, financial service provider 110 may include a social network service system 130 that is configured to provide social network services in a manner consistent with that disclosed above in connection with social network service system 130 shown in FIG. 1. In such embodiments, social network service system 130 may not be associated with a third-party social network service provider.

Figure 2B:
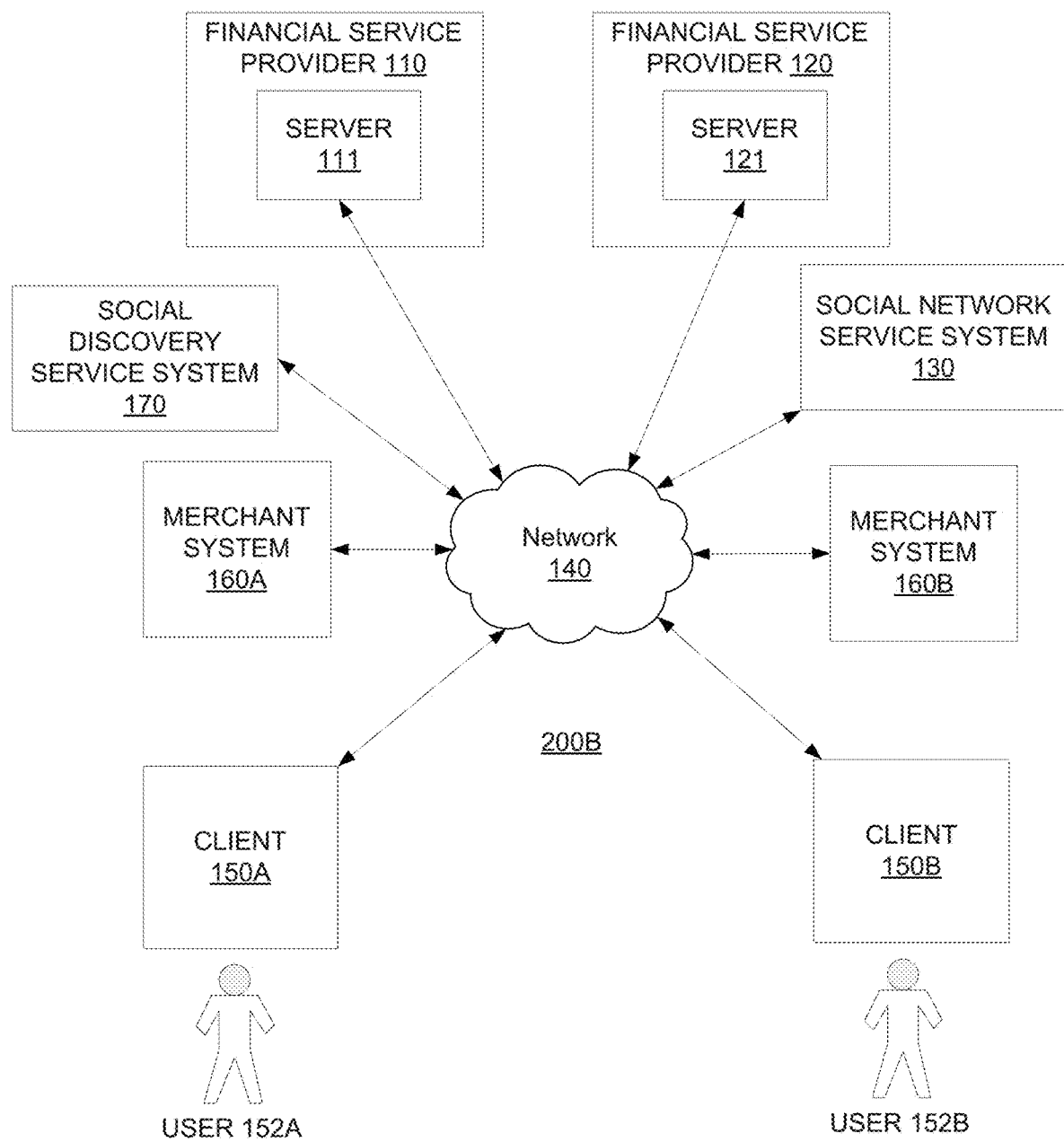
FIG. 2B is a block diagram of another exemplary system consistent with disclosed embodiments.

The disclosed embodiments include configurations that include a social discovery service system that provides a social discovery service consistent with the disclosed embodiments. FIG. 2B shows a block diagram of an exemplary system 200B including a social discovery system 170, multiple financial service providers 110, 120, social network service system 130, merchant systems 160A and 160B, and clients 150A and 150B. Financial service providers 110 and 120 may be configured and operate similar to financial service provider 110 disclosed above in connection with FIG. 1, with financial service provider 120 being a separate financial service provider than financial service provider 110. Similarly, social network service system 130, merchant systems 160A and 160B, and clients 150A and 150B may be configured and operate similar to the similarly labeled components disclosed above in connection with FIG. 1.

Social discovery service system 170 may be a computing system that is configured to provide a social discovery service consistent with disclosed embodiments. For example, social discovery service system 170 may include one or more computing devices (e.g., server(s)), memory storing data and/or software instructions (e.g., database(s), memory devices, etc.) and other known computing components. Social discovery service system 170 may be configured to communicate with one or more components of system 100, such as financial service provider 110, merchant systems 160, social network service system 130, and/or clients 150. Social discovery service system 170 may be configured to provide a social discovery service that provides interface(s) accessible by users over a network (e.g., the Internet), relating to social discovery service functions consistent with disclosed embodiments. Social discovery service system 170 may be configured to communicate with social network service system 130 to provide social network services. In other embodiments, social discovery service system 170 may be configured to provide its own social network services, such as social network services that integrate with the social discovery service provided by social discovery service system 170.

Figure 3:
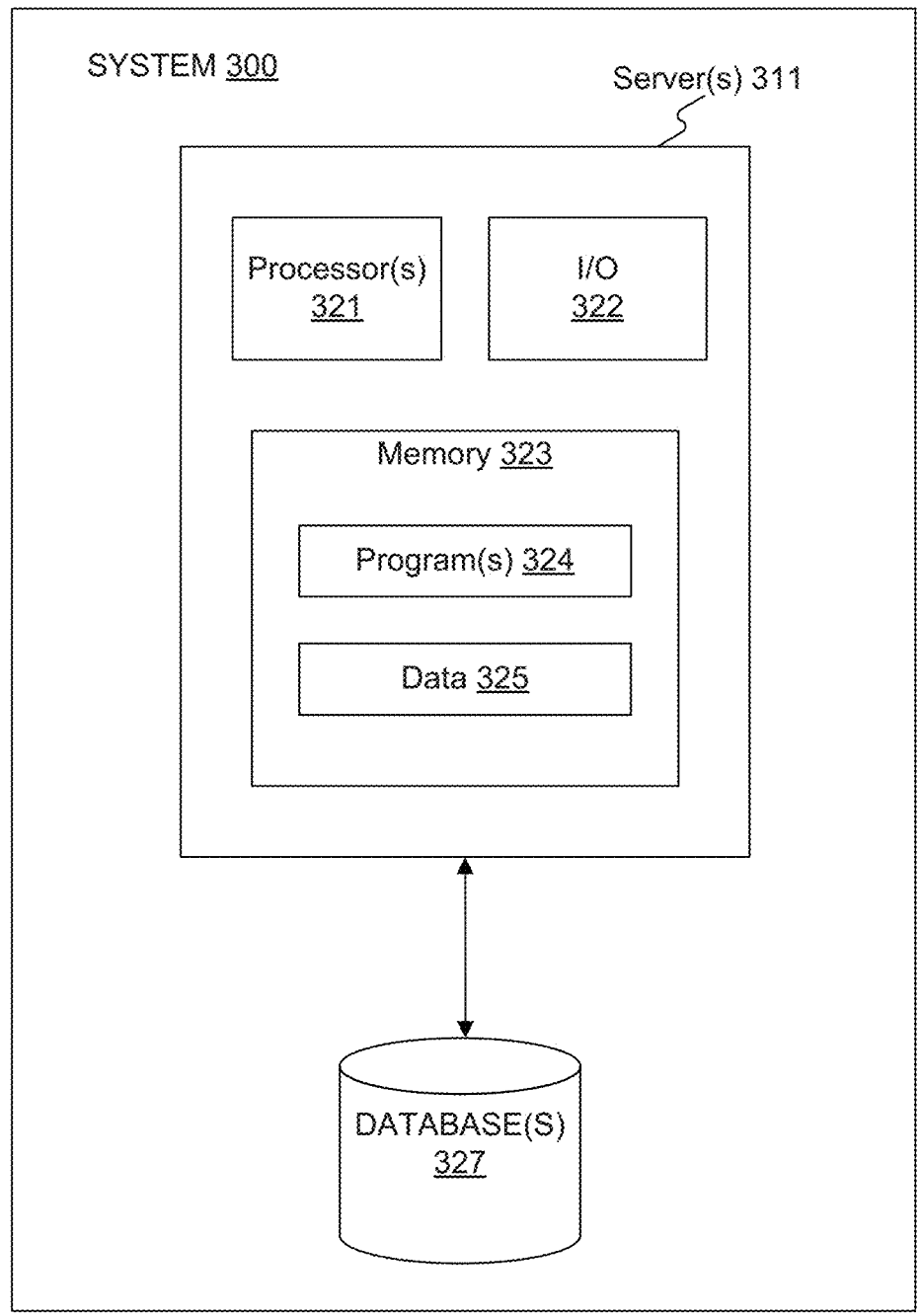
FIG. 3 is a block diagram of another exemplary system, consistent with disclosed embodiments.

FIG. 3 shows an exemplary system 300 that may be associated with financial service provider 110, social network service system 170, merchant system 160, and/or client 150. In one embodiment, system 300 may include a server 311 having one or more processors 321, one or more memories 323, and one or more input/output (I/O) devices 322. Alternatively, server 311 may take the form of a general purpose computer, a mainframe computer, or any combination of these components. In certain embodiments, server 311 (or a system including server 311) may be configured as a particular apparatus, system, and the like based on the storage, execution, and/or implementation of the software instructions that perform one or more operations consistent with the disclosed embodiments. Server 311 may be standalone, or it may be part of a subsystem, which may be part of a larger system. Server 311 may correspond to server 111, or any server or computing device included in social network service system 170, merchant system 160, and/or client 150 shown in FIGS. 1, 2A, and 2B.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 311.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example, financial service provider 110, social network service system 170, merchant system 160, or client 150, may, via server 311, access one or more remote programs that, when executed, perform functions related to certain disclosed embodiments. Memory 323 may also store data 325 that may reflect any type of information in any format that the system may use to perform operations consistent with the disclosed embodiments.

I/O devices 322 may be one or more device that is configured to allow data to be received and/or transmitted by server 311. I/O devices 322 may include one or more digital and/or analog communication devices that allow server 311 to communicate with other machines and devices, such as other components of systems 100, 200A, and 200B.

Server 311 may also be communicatively connected to one or more database(s) 327. Server 311 may be communicatively connected to database(s) 327 through network 140. Database 327 may include one or more memory devices that store information and are accessed and/or managed through server 311. By way of example, database(s) 311 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

The disclosed embodiments include systems and methods that provide a social discovery service. The social discovery service may provide a portal for users (e.g., consumers, merchant's, etc.) to request social discovery operations, review social discovery characteristics, form and/or join social communities, etc. In certain aspects, the disclosed embodiments may generate social discovery profiles for users based on social discovery characteristics, such as user demographics and other social traits that may be provided by the users (e.g., self profiling). In addition to, or in place of, social discovery characteristics, the disclosed embodiments may generate social discovery profiles based on transaction data relating to purchases made by users at merchants. The disclosed embodiments may also generate the social discovery profiles based on other information, such as location data (e.g., geographic location data of a user or user device (e.g., client 150)) at certain times (e.g., at the time of a purchase, etc.)). In addition, the disclosed embodiments may generate the social discovery profiles based on product data, such as SKU data or other product identifiers, relating to the purchase transactions monitored by the social discovery service.

Figure 4:
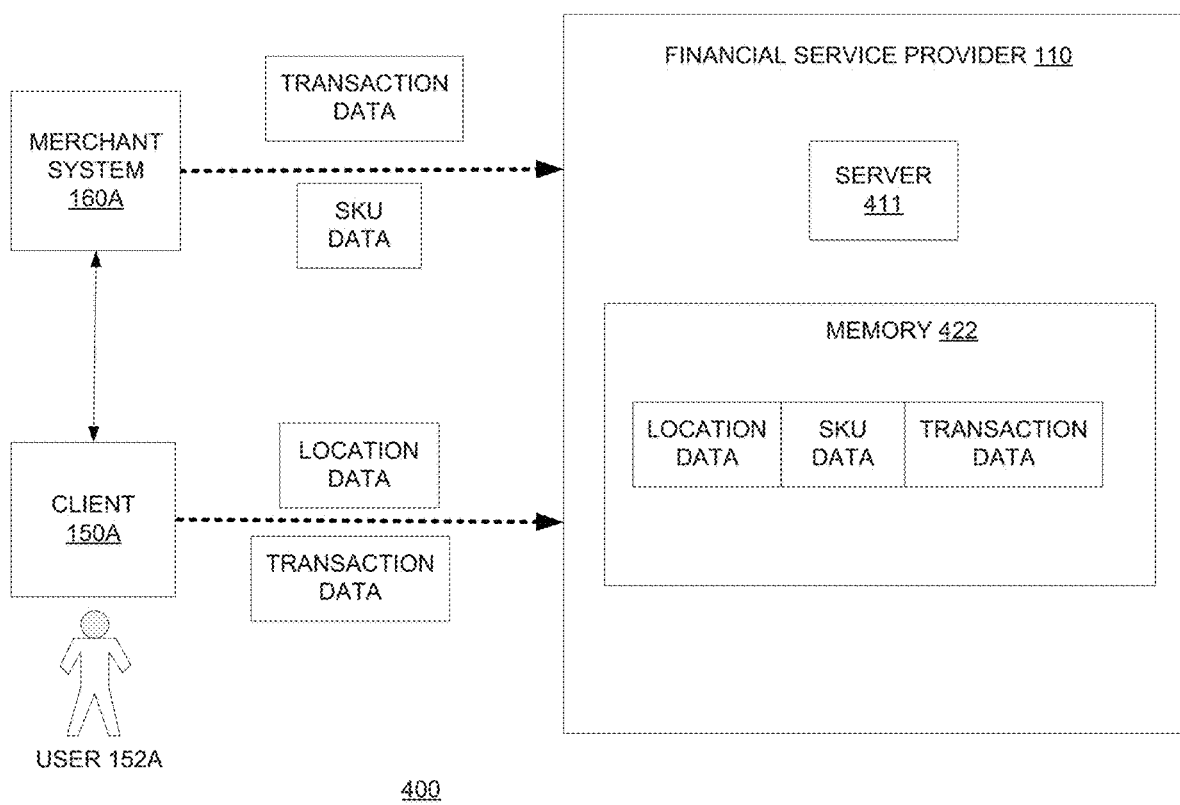
FIG. 4 is a block diagram of an exemplary system arrangement, consistent with disclosed embodiments.

FIG. 4 shows an exemplary system 400 that illustrates an example of communicating transaction and product data for generating social discovery profiles consistent with certain disclosed embodiments. In exemplary system 400, client 150A may be configured to collect and send location data to financial service provider 110. In one example, the location data may reflect a GPS or similar location of client 150A during a certain time, such as at the time of a purchase transaction at a merchant. Client 150A may also be configured to provide transaction data relating to purchase transactions, such as financial account information relating to a purchase (e.g., amount, account number, timestamp information, etc.). Client 150A may be used by user 152A to facilitate a purchase transaction with a merchant associated with merchant system 160A, such as in an online purchase transaction, or POS transaction involving a mobile device and data reader (e.g., RFID or Near Field Communications (NFC)).

Merchant system 160A may be configured to provide transaction data relating to a purchase transaction involving user 152A and/or client 150A, such as the transaction data typically provided by merchants to financial service providers. Merchant system 160A may also be configured to provide product data (e.g., SKU data) relating to the purchase transaction involving user 152A and/or client 150A. The product data may identify the goods or services purchased by user 152A during the transaction.

Financial service provider 110 may receive and store the location data, product data, and transaction data from client 150A and/or merchant system 160A in a memory (e.g., memory 422). Financial service provider 110 may be configured to provide a social discovery service system that provides a social discovery service and performs social discovery operations consistent with the disclosed embodiments. Components of financial service provider 110 may be configured to provide the received location data, product data, and transaction data to the social discovery system for performing such operations. In certain embodiments, the social discovery service system may be implemented separate from financial service provider 110.

Figure 5:
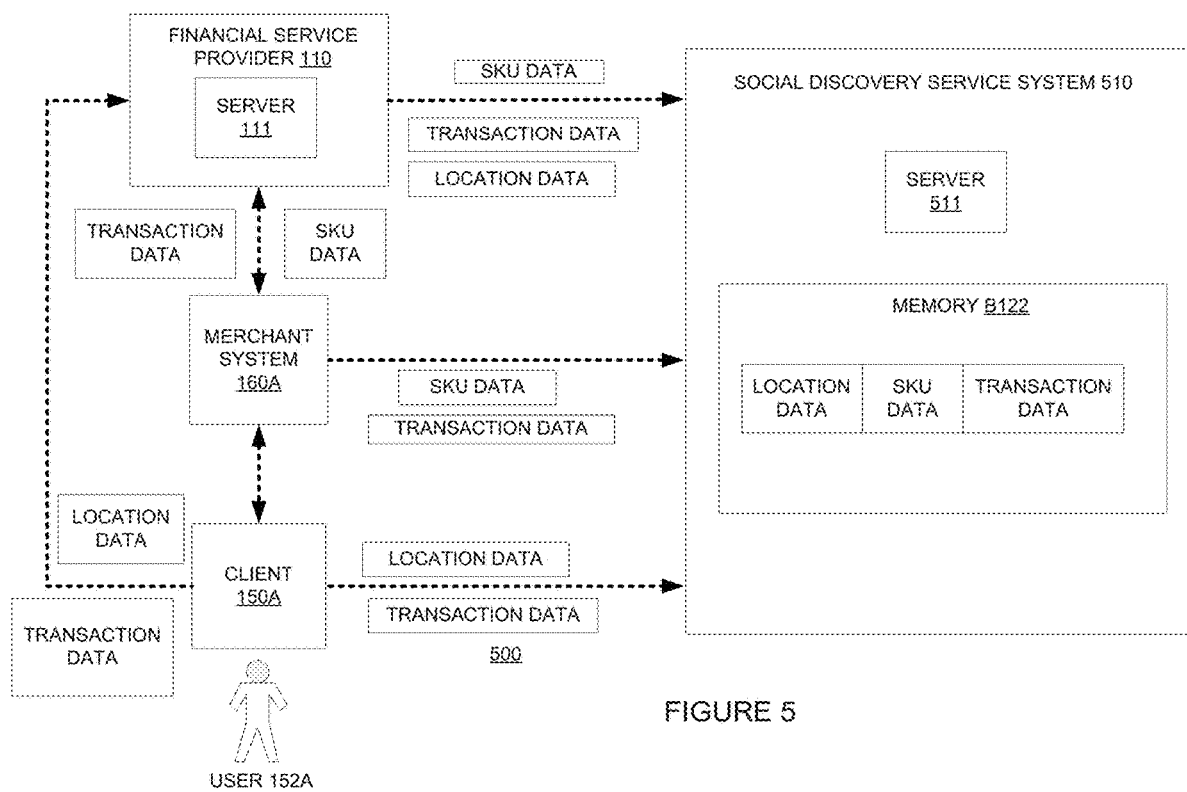
FIG. 5 is a block diagram of another exemplary system arrangement, consistent with disclosed embodiments.

FIG. 5 shows a block diagram of an exemplary system 500 that includes a social discovery service system 510 consistent with certain disclosed embodiments. In one embodiment, social discovery service system 510 may be a system included with or provided by financial service provider 110, such as the social discovery service system 130 exemplified in FIG. 2A. In other embodiments, social discovery service system 510 may be a system separate from other components, such as the social discovery service system 170 exemplified in FIG. 2B. Social discovery service system 510 may receive location data and transaction data relating to purchase transactions from client 150A. In other embodiments, client 150A may provide location data and transaction data to financial service provider 110 in a manner similar to that disclosed above in connection with FIG. 4.

Merchant system 160A may collect, generate, and provide transaction data relating to purchase transactions involving user 152A and/or client 150A to social discovery service system 510. Merchant system 160A may also collect, generate, and provide product data (e.g., SKU data) to social discovery service system 510. In some embodiments, merchant system 160A may provide product data (e.g., SKU data) and transaction data relating to purchase transactions involving customers of the merchant relating to merchant system 160A to financial service provider 110.

In some embodiments, financial service provider 110 may provide transaction data and/or location data received from client 150A and/or merchant system 160A to social discovery service system 510. Financial service provider 110 may also send other information to social discovery service system 510, such as credit profile information for users (e.g., customers). Further, financial service provider 110 may send product data (e.g., SKU data) received from merchant system 160A to social discovery service system 510. Social discovery service system 510 may be configured to execute software processes to perform social discovery operations, including generating social discovery profiles, creating consumer habit profiles, social discovery communities (e.g., relationships including consumers with similar shopping habits, consumer who purchase similar goods and/or services, consumers who shop at the same merchant(s), etc.), and other operations consistent with the disclosed embodiments.

As explained, the disclosed embodiments may provide a social discovery service that users, merchants, or other entities can register with to request and receive information relating to social discovery operations consistent with disclosed embodiments. The social discovery service may be provided by a social discovery service system that may be associated with financial service provider 110, social network service provider 130, or may another entity that provides social discovery services consistent with the disclosed embodiments. The social discovery service may be provided via an online portal that is accessible by computing systems over network 140 (e.g., Internet) and provides interfaces with content, data entry selections, menu selections, and other well known interface components known to those skilled in the art, such as web page interactive content, graphics, icons, audio files, etc.

Figure 6:
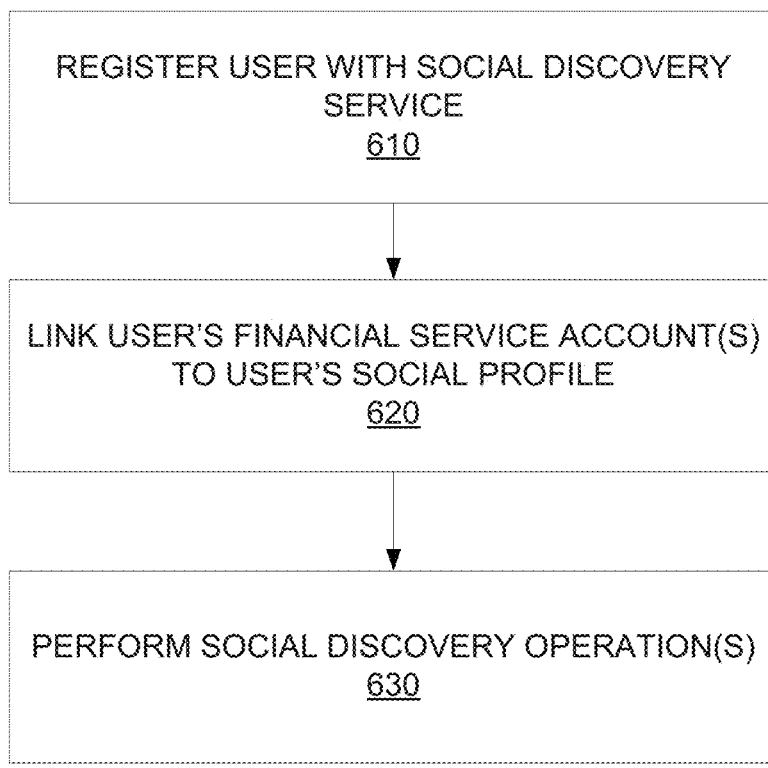
FIG. 6 is a flowchart of an exemplary registration process, consistent with disclosed embodiments.

FIG. 6 shows a flowchart of an exemplary social discovery service registration process consistent with disclosed embodiments. In one aspect, social discovery service system (e.g., system 130, 170, 510), may receive a request from a user (e.g., user 152) to register with the social discovery service (step 610). The request may be provided via the social discovery service portal using interfaces provided to client 150 or any other computing device relating to the user. The social discovery service system may request and receive information from the user, such as demographic information, self-provided characteristics (e.g., likes, hobbies, favorite products, movies, etc.). In addition, the social discovery service system may request and receive financial service account information from the user. For example, the social discovery service system may receive from the user information that allows the social discovery service system to interface with and receive information from one or more financial service providers that the user is a customer of (e.g., credit card account information, etc.). The financial service account information may include the identity of a financial service account, the identity of the financial service account provider, credentials that enable the social discovery service system to access and/or receive information relating to the user's financial service account.

In one embodiment, the social discovery service system may use the financial service account information to communicate with a financial service provider (e.g., 110) to configure a communication protocol and/or link that enables the social discovery service system to receive information from the financial service provider (e.g., 110) relating to purchase transactions made by the user using a financial service account provided by the financial service account provider. The social discovery service system may link the user's financial service account(s) to a user social profile that may be generated by the social discovery service system (step 620). Once configured, the social discovery service system may use the information provided by the financial service provider (e.g., transaction data, etc.) to perform social discovery operation(s) (step 630). The social discovery operations may include operations responsive to a request by the user through the social discovery service. The social discovery operations may include operations that are automatically performed (e.g., without request by a registered user), such as creating, updating, editing, or deleting social profiles for the user or social discovery graphs, communities, etc. that include the user.

Figure 7:
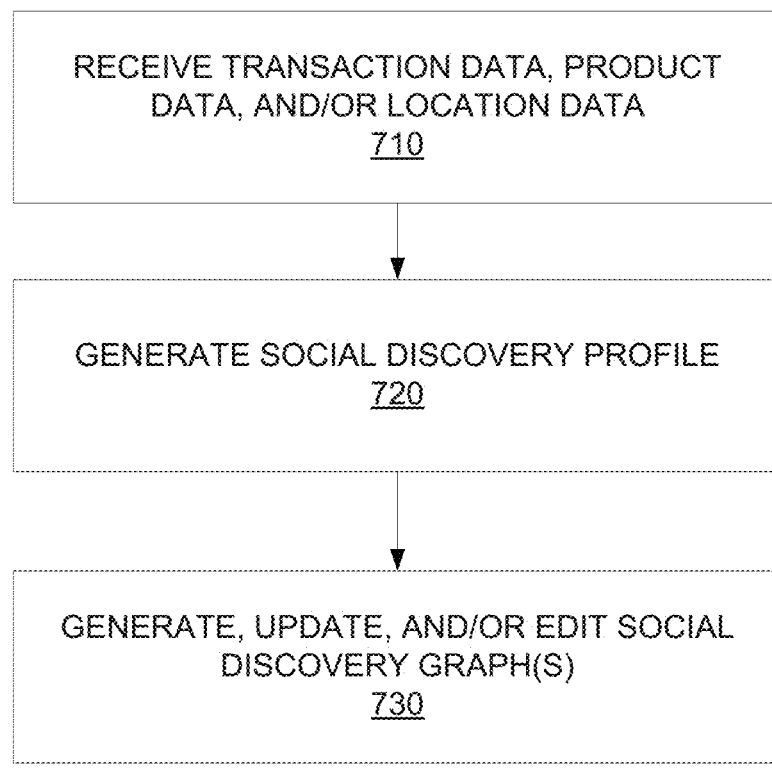
FIG. 7 is a flowchart of an exemplary social discovery graph process, consistent with disclosed embodiments.

FIG. 7 shows a flowchart of an exemplary social discovery graph process consistent with disclosed embodiments. In one embodiment, the social discovery service system (e.g., system 130, 170, 510) may be configured to receive information relating to purchase transactions made by users (e.g., registered users of the social discovery service). In one aspect, the social discovery service system may receive transaction data, product data, and/or location data relating to a purchase transaction by a user (e.g., user 152A) with a merchant (e.g., a merchant associated with merchant system 160A) (step 710). The social discovery service system may receive the transaction data, product data, and/or location data from financial service provider (e.g., 110), the merchant via merchant system (e.g., merchant system 160A), and/or client associated with the user (e.g., client 150A). The social discovery service system may receive this information in a manner similar to that disclosed above in connection with FIGS. 4 and 5. The transaction data, product data, and/or location data may relate to a single purchase transaction (e.g., user 152A purchasing one or more items at a certain time from a certain merchant). In other embodiments, the transaction data, product data, and/or location data may include information relating to multiple purchase transactions (e.g., one or more user 152A purchase transactions involving a first merchant, and/or one or more purchase transactions involving one or more other merchants). Further, the social discovery service system may receive transaction data, product data, and/or location data relating to one or more users (e.g., a batch file of transaction data relating to purchase transactions involving many users and merchant system 160A over a period of time).

Based on the received transaction data, product data, and/or location data, the social discovery service system may generate a social discovery profile for a user (step 720). A social discovery profile may be a user social discovery profile that identifies certain characteristics of the user relating to the purchase transactions that the user performed. For example, a social discovery profile may be a user profile that includes shopping habits for the user (e.g., shops at certain times of day, shops on certain days, purchases certain products (e.g., buys a specific brand of coffee, buys certain types of products more often than other products (e.g., infant-related goods)), shops at a particular merchant or merchants more often than others, etc.). In certain embodiments, the social discovery service system may generate social discovery profiles based on the received transaction data, product data, and/or location data, thus forming profiles that provide a purchase transaction relationship with a user. The social discovery service system may store the social discovery profile(s) in a memory. The social discovery profile(s) may be stored in any data format, configuration, etc.

In certain embodiments, the social discovery service system may generate, edit, and/or update one or more social discovery graphs (step 730). A social discovery graph may reflect a profile of one or more characteristic(s) in relation to one or more users, merchants, or other entities. For example, a social discovery graph may include a shopping graph that relates to shopping characteristics of a group of users. In one example, a shopping graph may reflect a consumption pattern of consumers, such as the purchase of a type of product or service (e.g., sporting goods, toys, coffee, etc.), a time or day pattern associated with purchases (e.g., purchases made mostly on weekends, after 5:00 pm on weekdays, etc.), etc. A shopping graph may reflect a relationship involving a combination of one or more consumption patterns (e.g., the purchase of a type of product on certain time/dates). A social discovery graph may reflect a shopping graph specific to certain merchants (e.g., consumers who shop at specific merchants or merchant locations). A shopping graph may reflect a relationship between a specific product or groups of products and consumers and/or merchants. In other aspects, a social discovery graph may reflect a relationship between a common transaction goal and a group of users (e.g., a group of users with a common goal to donate funds to a specific charity, cause, event, etc.). As another example, a social discovery graph may reflect a relationship associated with a level of trust between two or more users (e.g., a group of users who are assigned a level of trust among the members of the shopping graph for purposes of exchanging or transferring funds).

Social discovery graphs may be stored as information in a data structure in a memory. Processing components of the disclosed embodiments (e.g., a server of social discovery service system 130, 170, 510) may generate and store social discovery graphs in a memory that access the stored social discovery graph data structures to perform one or more operations consistent with the disclosed embodiments.

Figure 8:
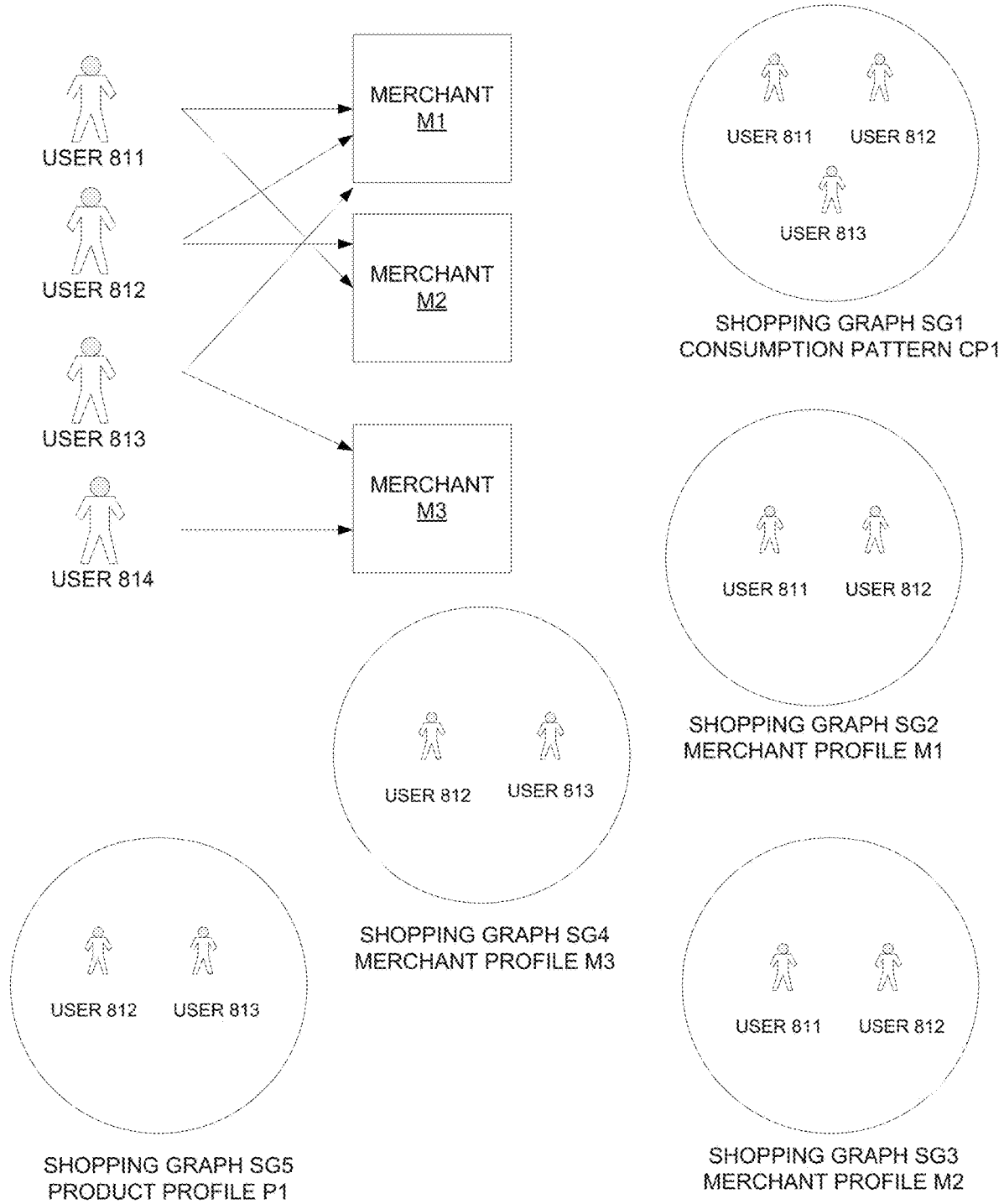
FIG. 8 is a block diagram of exemplary social graph arrangements, consistent with disclosed embodiments.

FIG. 8 shows a block diagram of an exemplary arrangement of shopping graphs consistent with certain disclosed embodiments. As shown, users 811, 812, 813, and 814 may be consumers who purchase goods at merchants M1, M2, and/or M3. For example, users 811 and 812 may purchase goods from merchants M1 and M2. User 813 may purchase goods from merchants M1 and M3. User 814 may purchase goods from merchant M3. In certain embodiments, a social discovery service system (e.g., system 130, 170, 510) may receive transaction data, product data, and location data associated with the purchase transactions involving users 811-814. Based on that information, the social discovery service system may generate shopping graphs that reflect certain relationships between the users and/or merchants shopping patterns or characteristics. For instance, the disclosed embodiments may generate a shopping graph SG1 that includes users that have a consumption pattern CP1 (e.g., users who purchase the same type of product, purchase goods in similar time/day ranges, etc.). The disclosed embodiments may generate a shopping graph SG2 (reflecting a merchant M1 profile) that includes users who purchase goods from merchant M1. Similarly, the disclosed embodiments may generate a shopping graph SG3 (reflecting a merchant M2 profile) that includes users who purchase goods from merchant M2, and a shopping graph SG4 (reflecting a merchant M3 profile) that includes users who purchase goods from merchant M3. The disclosed embodiments may also generate a shopping graph SG5 (reflecting a product profile P1), which may reflect users who purchase a specific product (e.g., SKU, brand type, product type, etc.).

In certain embodiments, the social discovery service system (e.g., system 130, 170, 510) may be configured to generate and store data structures associated with the social discovery graphs. The social discovery service system may be configured to automatically generate, edit, update, or modify social discovery graphs. The social discovery service system may also be configured to generate, edit, update, or modify social discovery graphs in response to requests from users.

Figure 9:
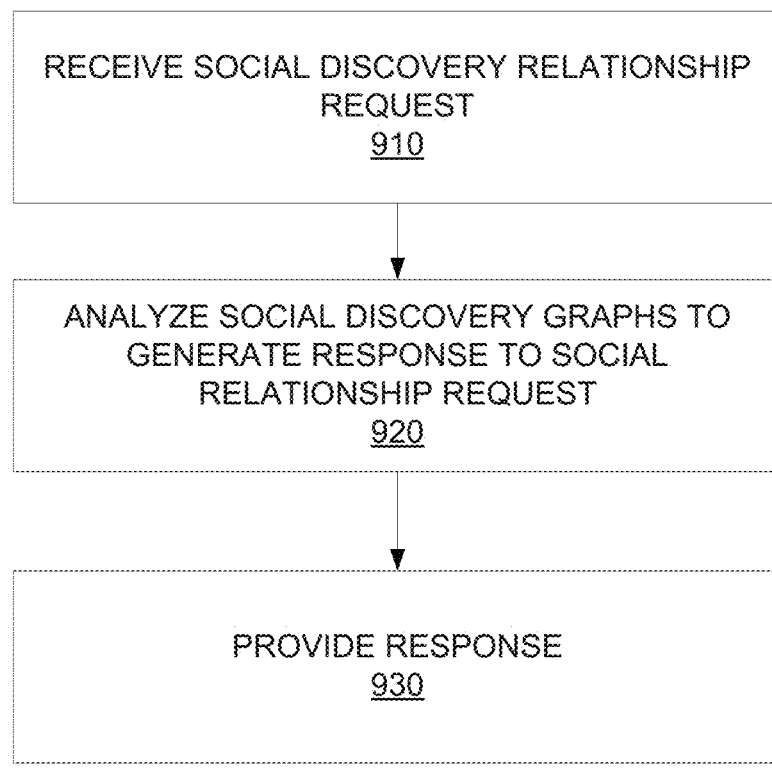
FIG. 9 is a flowchart of an exemplary social discovery relationship request process, consistent with disclosed embodiments.

The disclosed embodiments may be configured to allow a user to search, view, and collect information relating to social discovery relationships consistent with disclosed embodiments. FIG. 9 shows a flowchart of an exemplary social discovery relationship request process consistent with certain disclosed embodiments. In one embodiment, a social discovery service system consistent with disclosed embodiments may receive a social relationship request (step 910). The request may be received from a user, such as a consumer or a user associated with a merchant (e.g., user 152A via client 150A or a user operating merchant system 160B). In one embodiment, the social discovery service system may generate and provide an interface that includes an option that may be selected by the user to request social discovery relationships.

The social discovery relationship request may be a request to search and receive information relating to social discovery relationships based on selected search attributes. For example, the social discovery service system may receive a request that includes selected shopping patterns, consumption patterns, merchants, specific products, product types, product brands, location, shopping habits, shopping habits, shopping preferences or dislikes, etc. For instance, the social discovery service system may provide an interface that allows a user to search for social discovery graphs concerning certain relationships (e.g., search for consumers who shop at merchant M1, search for consumers who purchase product A, search for consumers who shop at a certain location (e.g., a mall, a shopping district, a town, city, zip code, etc.), search for consumers who purchase products at certain times of day or on certain days of the week, or on certain holidays, etc.).

In response to the request, the social discovery service system may analyze one or more social discovery graphs to generate a response to the social discovery relationship request (step 920). For example, the social discovery service system may use the one or more search attributes to search stored social discovery graphs (via, for example, data structures stored in one or more memories) to identify social discovery graphs that match the search parameters associated with the selected search attributes. The social discovery service system may generate and provide a response to the social discovery request based on the analysis of the social discovery graphs (step 930). For example, the social discovery service system may generate one or more interfaces that provide information reflecting one or more social discovery graphs that meet a user's social discovery relationship request (e.g., list of social communities, groups, etc. having certain characteristics, such as shopping habit H1 community, shopping pattern P2 community, merchant M1 customers, etc.). The response may identify the user(s) included in the shopping graphs identified in the response. The response (e.g., the interface providing the response) may include hyperlinks for each user identified in one or more of the identified shopping graphs. The response interface may provide results of the social discovery relationship request in any format and configuration, such as for example, through graphics, animations, text, drop down menus, tables, interactive lists, etc. The disclosed embodiments are not limited to any format, configuration, and look and feel of the interface(s) including the results.

Figure 10:
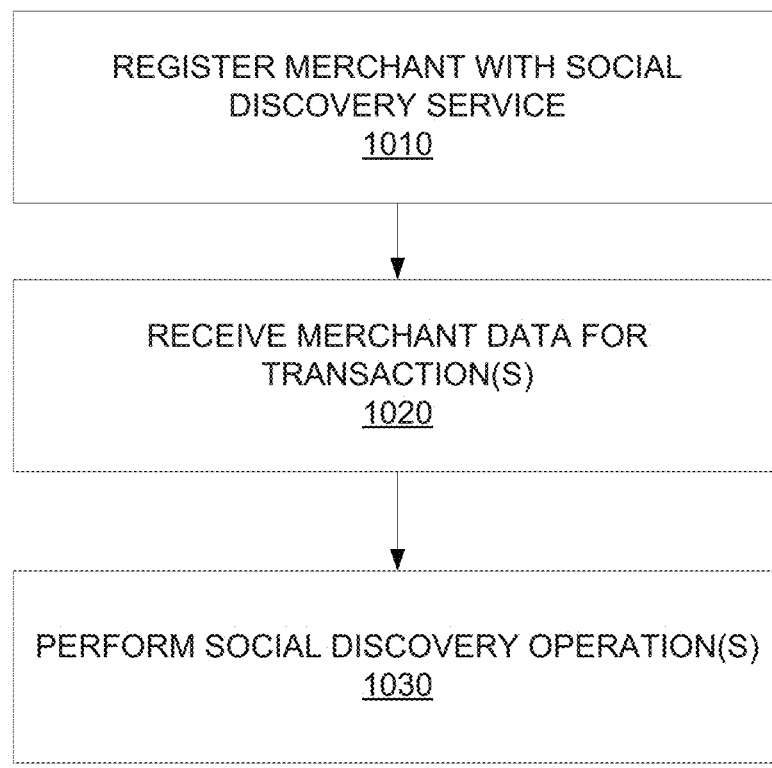
FIG. 10 is a flowchart of an exemplary merchant registration process, consistent with disclosed embodiments.

FIG. 10 shows a flowchart of an exemplary registration process involving a merchant consistent with disclosed embodiments. At step 1010, a user associated with a merchant (e.g., a user operating merchant system 160A or 160B) may generate and issue a social discovery service registration request consistent with the disclosed embodiments. In one aspect, a social discovery service system (e.g., 130, 170, 510) may receive the registration request and perform one or more processes to register the merchant identified in the request. The registration request may be separately provided by the user via another message, via an interface, etc. For example, the social discovery service system may generate a social discovery account for the merchant that is accessible by users with proper credentials through the social discovery service provided by the social discovery service system. In certain embodiments, the social discovery service system may configure one or more processes and communication links for receiving merchant data from the registered merchant via for example a merchant system (e.g., merchant system 160). For instance, the social discovery service system may configure ways for a merchant to provide merchant data (e.g., product data, transaction data, etc.) relating to purchase transactions to the social discovery service system. In one example, a merchant system 160 may be configured to allow the social discovery service system to request and receive product data and/or transaction data associated with purchase transactions involving the merchant. As another example, the social discovery service system may be configured to receive unsolicited transaction data associated with purchase transactions (e.g., merchant system 160A may be configured to automatically send product data and/or transaction data to social discovery service system periodically, upon completion or during a purchase transaction, after a certain number of purchase transactions have occurred with the merchant, etc.).

The social discovery service system may be configured to perform one or more social discovery operations based on the merchant data (e.g., product data, transaction data, etc.) consistent with the disclosed embodiments. The social discovery operations may include those disclosed above, such as processing social discovery relationship requests, generating, updating, deleting, or modifying social discovery graphs. They may also include operations specific for merchants. For instance, the social discovery service system may generate a merchant profile for a registered merchant that includes characteristics for that merchant (e.g., location, type of merchant, types of goods sold by the merchant, product specific data provided by the merchant, suppliers of the merchant, etc.).

Figure 11:
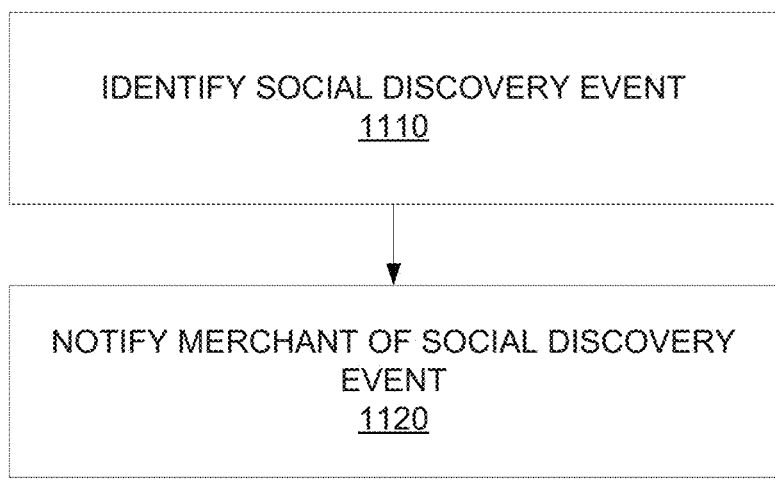
FIG. 11 is a flowchart of an exemplary social discovery event process, consistent with disclosed embodiments.

In certain embodiments, a social discovery service system consistent with the disclosed embodiments may be configured to perform processes that notify a merchant when consumers who match one or more profiles, consumption patterns, shopping habits, etc. are in a particular merchant location, or are shopping online, etc. FIG. 11 shows a flowchart of an exemplary social discovery event process consistent with certain disclosed embodiments. At step 1110, the social discovery service system (e.g., 130, 170, 510) may monitor purchase transactions, location data, online shopping transactions or browsing sessions, etc. of registered users to identify a social discovery event. The social discovery service system may also analyze social discovery graphs and related social profiles stored in memory to determine whether a social discovery event exists. In one embodiment, a social discovery event may be an event that is related to a merchant and consumers of that merchant. For example, a social discovery event may include an event where a certain number of users (e.g., one or more) registered with the social discovery service are located in a particular store of a merchant at the same time. A social discovery event may include an event where a certain number of users (e.g., one or more) with certain shopping characteristics (e.g., members of one or more shopping graphs, etc.) are located in or near a particular store of a merchant at a given time (e.g., ten consumers who purchase coffee brand X are in merchant location Y (e.g., grocery store at a certain address, etc.)).

The social discovery service system may be configured to generate a notification relating to the social discovery event and send the notification to a merchant system associated with the merchant (e.g., merchant system 160A, 160B, etc.) (e.g., step 1120). In one aspect, the notification may include a description of the type of event (e.g., store X at location Y, has N consumers who have a shopping habit SH). The notification may also provide shopping profile information for each identified user, or provide a link to obtain the shopping profiles for each identified user. In certain aspects, the social discovery service system may be configured to send the notification in the form an alert to one or more users (e.g., certain merchant employees). The alert may be provided via email, text message, or other forms of communication.

In one embodiment, the merchant who receives the social discovery event notification may be configured to perform a shopping incentive process. For example, merchant system 160 associated with the merchant may receive the notification and, in response, generate a temporary sale of products that are identified in the shopping graph or profiles associated with the identified users (e.g., 20 minute sale on coffee brand X). In one embodiment, the social discovery service system may provide a notification to each of the identified users at the merchant location of the incentive. Merchant system 160 may be configured to send the social discovery service system authorization to provide the notification to the identified users, or the social discovery service system may be configured to automatically send the notification to the users based on predefined rules associated with the merchant.

In one example, the social discovery service system may provide an online social discovery service that identifies for a merchant when a certain number of users who are members of a certain shopping graph (e.g., have common shopping habits, consumption patterns, etc.) are browsing the merchant's website that provides goods for sale. The social discovery service system may access to the server(s) that provide the merchant's web site to assess visiting users and determine whether any of the users are registered users of the social discovery service (via, for example, account identifiers, usernames, etc.) The social discovery service system may use the transaction data, product data, location data, and other information relating to purchase transactions associated with the online users to determine whether a group of the users (e.g., a determined number of users, such as 10, 100, etc.) purchased, or may purchase certain products (e.g., items in a shopping cart). In one aspect, the social discovery service system may notify the merchant (via merchant system 160, for example) that a social discovery event exists that a certain number customers each having a common shopping pattern are currently shopping online at the merchant's website. The merchant's merchant system 160 may be configured generate and provide (e.g., via the website) incentives to each of the identified users to promote sales of products (e.g., cross-selling other products or to provide discounts on a product or types of products that each user is interested in based on the shopping graph relationships associated with the users).

In one embodiment, the social discovery service system or merchant system 160A may be configured to generate and provide an offer to each of the identified users in the identified shopping graph an option to join a real-time discount group to receive a discount (or other incentive) that can be redeemed during the users' shopping session with the merchant's website. For example, the social discovery service system or merchant system 160 may provide to each identified user a message that the user can receive a 15% discount on a particular product if five or more other like-configured users (e.g., those in the same shopping graph) purchase the product within the next ten minutes. The discount can be redeemed after the purchase transaction, be provided as store credit, can be processed via financial service provider 110 (or respective providers for the users) etc.

Figure 12:
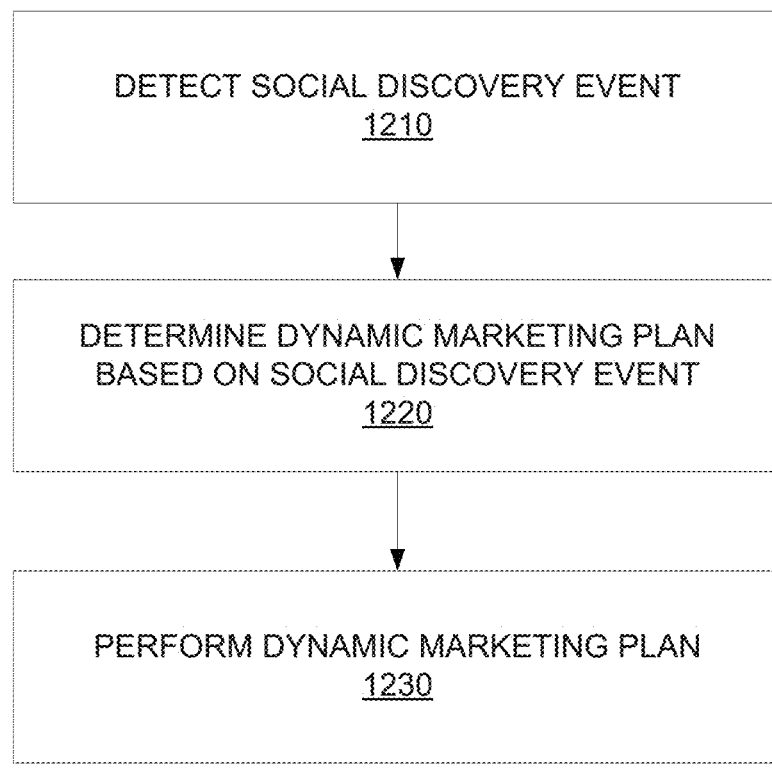
FIG. 12 is a flowchart of an exemplary dynamic market plan process, consistent with disclosed embodiments.

FIG. 12 shows a flow chart of an exemplary dynamic marketing plan process that may be performed via the disclosed embodiments. In one embodiment, a social discovery service system consistent with disclosed embodiments may detect a social discovery event (step 1210). The social discovery service system may detect a social discovery event similar to that disclosed above in connection with FIG. 11. Based on the social discovery event, the social discovery service system may determine a dynamic marketing plan (step 1220). The disclosed embodiments may then perform the dynamic marketing plan (step 1230). In one embodiment, the dynamic marketing plan may be a plan that provides a recommendation to a merchant based on the social discovery event. For instance, the social discovery service system may determine that a certain number of consumers who have purchased a particular product, product type, etc. are located near or in a merchant store location. The social discovery service system may generate an incentive message based on one or more predetermined rules or configurations that is provided by the social discovery service system to the users via respective clients 150 (e.g., five users are within 200 feet of merchant M1 store location receive a discount message for a discount on a particular product at merchant M1.

In certain embodiments, a merchant system (e.g., system 160A) may perform one or more of the process steps of FIG. 12. For example, in response to a notification of a social discovery event from the social discovery service system, merchant system 160A may execute software to determine the dynamic marketing plan (e.g., step 1220). Merchant system 160A may be configured to perform the dynamic marketing plan (e.g., step 1230). For example, merchant system 160A may generate advertisements for certain products that are provided to an electronic display in the brick and mortar location of the merchant associated with merchant system 160A (e.g., update digital displays in a store location based on the dynamic marketing plan). As another example, the dynamic marketing plan may include incentives associated with financial service provider 110 (or financial service providers associated with the identified users at the merchant location or near the location). For example, the merchant system 160A may send a message to an electronic display in the brick and mortar location of the merchant associated with merchant system 160A that provides an incentive to users who have accounts with financial service provider 110 (e.g., receive 10% your total purchase if you use your credit card provided by financial service provider 110).

Figure 13:
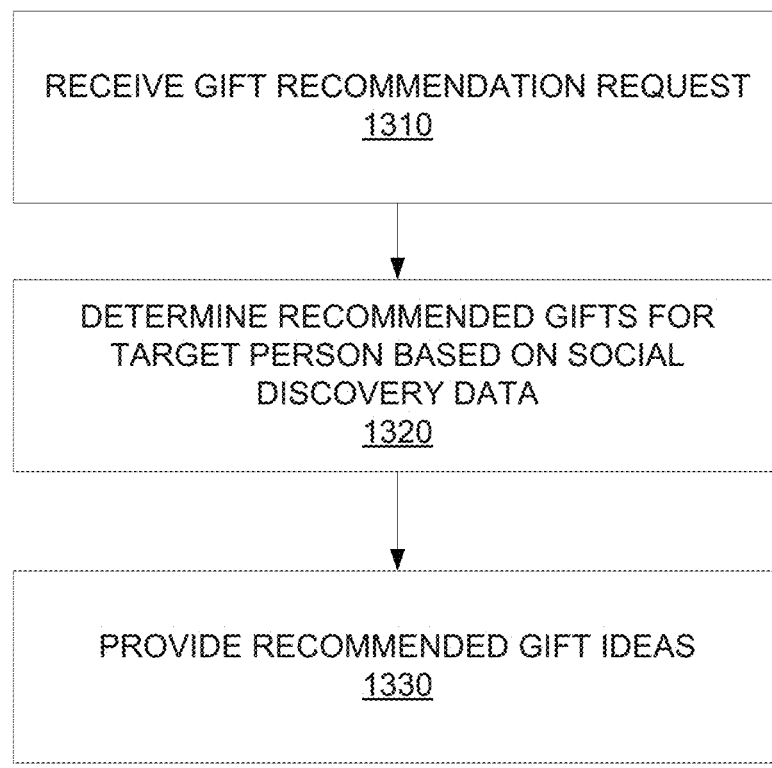
FIG. 13 is a flowchart of an exemplary gift recommendation process, consistent with disclosed embodiments.

FIG. 13 shows a flowchart of an exemplary social discovery operation relating to gifting consistent with disclosed embodiments. In one embodiment, a user (e.g., user 152A) may wish to provide a gift to another person. The user may use the social discovery service of the disclosed embodiments to receive recommendations of gift ideas based on social discovery profile information relating to the target person (e.g., the intended recipient of the gift). For instance, the social discovery service system may receive a gift recommendation request (step 1310) (e.g., via client 150A from user 152A). In response, the social discovery service system may execute software instructions that determine one or more recommended gift ideas for the target person based on social discovery data relating to the target person (e.g., step 1320). In one aspect, the target person is a user registered with the social discovery service provided by the social discovery service system and, for example, has a social profile, is a member of one or more shopping graphs, etc. For example, the social discovery service system may access and analyze the purchase transaction data, product data, social discovery profile, shopping graphs, etc. associated with the target person. The social discovery service system may generate a recommendation response and provide the recommendation response to the requesting user (step 1330) (e.g., via an interface accessible by client 150A, via email, text message, etc. received by client 150A, etc.). As an example, the social discovery service system may determine based on the social discovery graphs associated with the target person that the target person likes coffee brand X. The social discovery service system may provide a recommendation to the requesting user to purchase a gift involving coffee brand X for the target user. The recommendation may include more than one gift ideas and may be related to recommendations other than specific products.

Figure 14:
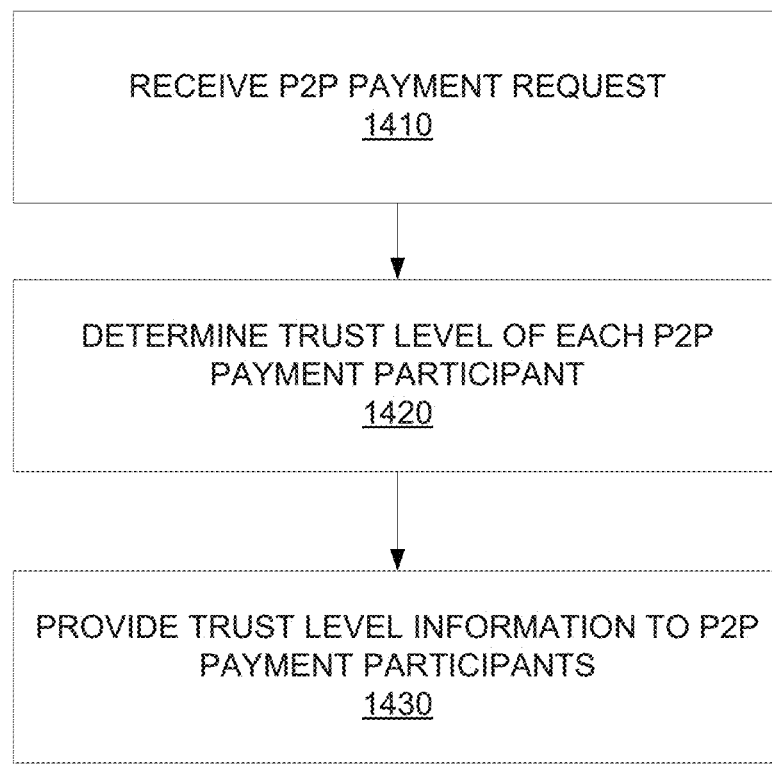
FIG. 14 is a flowchart of an exemplary trust level process, consistent with disclosed embodiments.

In certain embodiments, the social discovery service system (e.g., 130, 170, 510) may be configured to determine and store a trust level for a registered user of the social discovery service. For example, based on certain criteria (e.g., relationships with other users, purchase history of the user, financial profile data provided by financial service provider (e.g., 110, 120), the social discovery service system may determine a trust level in relation to other registered users of the social network service. FIG. 14 shows a flowchart of an exemplary P2P payment process consistent with disclosed embodiments. In one embodiment, a social discovery service system consistent with the disclosed embodiments (e.g., 130, 170, 510) may receive a P2P payment request (step 1410) (e.g., from a user (e.g., user 150A)). The request may identify the user providing the request and another user participating with a P2P payment (e.g., user 150A wishes to transfer funds to user 150B, both who are registered with the social discovery service). The social discovery service system may be configured to determine a trust level of each participant of the P2P process (step 1420). In one embodiment, the social discovery service system may consider common social discovery characteristics to determine the trust level (e.g., high, medium, low; trustworthy, not trustworthy, numerical values, color codes, etc.). For example, the social discovery service system may determine users who both are customers of the same financial service provider (e.g., provider 110) have a high trust level in relation to each other. As another example, the social discovery service system may determine the trust level of P2P participants based on whether the participants shop at the same merchant, or purchase similar products, or have common social profile characteristics, have a common relationship with another person who is not a participant of the P2P process, etc.).

The social discovery service system may provide trust level information to the P2P payment participants (step 1430). For example, the social discovery service system may generate and send a message to client 152A and 152B that is displayed via display device indicating the trust level or an associated message of the other participant. In one embodiment, the social discovery service system may be configured to send a message to the financial service provider of the requesting P2P participant indicating that a fund transfer from the user is authorized, etc. The authorization may be initiated by the user (e.g., via client 152A) or may be configured to be sent automatically based on predefined rules configured by the requesting participant.

Figure 15:
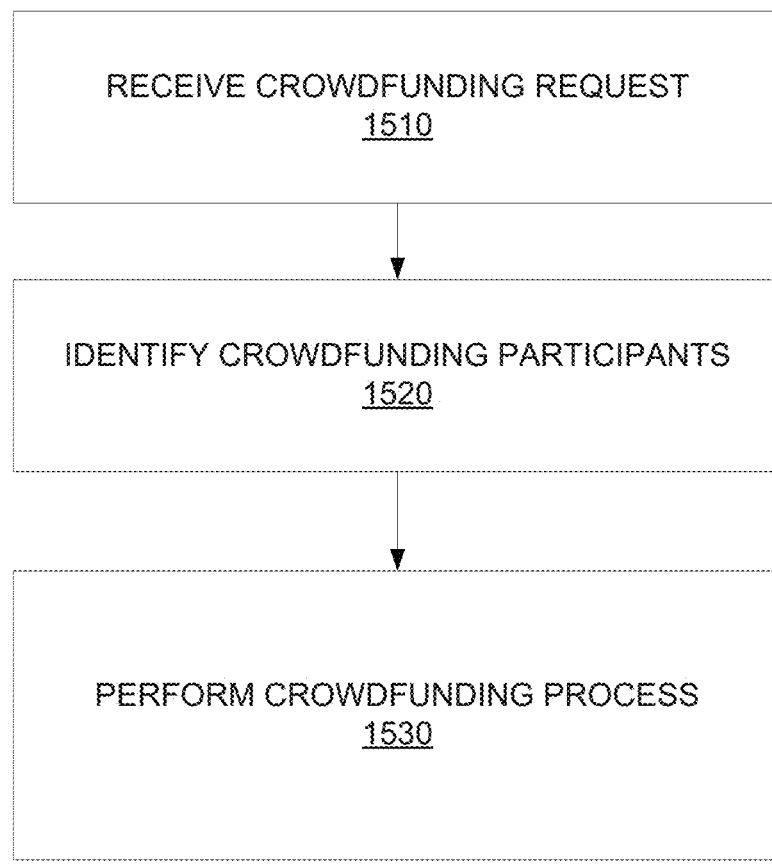
FIG. 15 is a flowchart of an exemplary crowdfunding process, consistent with disclosed embodiments.

FIG. 15 shows a flowchart of an exemplary crowdfunding process consistent with certain embodiments. In one aspect, the social discovery service system may receive a crowdfunding request from a user (step 1510). The crowdfunding request may identify a particular event, cause, service, etc. that the user would like to fund with others. Based on the crowdfunding request, the social discovery service system may identify crowdfunding participants (step 1520). For example, the social discovery service system may identify crowdfunding parameter(s) (e.g., a product, characteristic, habit, consumption pattern, trait, etc.), and use the parameter(s) to search, analyze and assess the social discovery profiles, social discovery graphs, etc. stored by the social discovery service system to identify other users with common traits, social discovery characteristics, etc. According to some embodiments, the parameter(s) use crowdfunding parameter(s) provided by the user in the crowdfunding request. The social discovery service system may then perform a crowdfunding process consistent with the crowdfunding request and based on the identified crowdfunding participants (e.g., step 1530).

For example, a user may provide a request to the social discovery service system to identify other users who may be interested in funding a school event, a social event, a community cause, etc. Based on the request, the social discovery service system may identify other users registered with the social discovery service who may be interested in joining the crowdfunding effort based on the transaction data, product data, location data, social profile data, social discovery graphs, etc. stored by the social discovery service system. The social discovery service system may send notifications to the identified users of the crowdfunding effort to allow the users to participate. In other aspects, the social discovery service system may generate a social discovery graph for the crowdfunding effort that may be accessible by users who agree to joining the crowdfunding effort.

Figure 16:
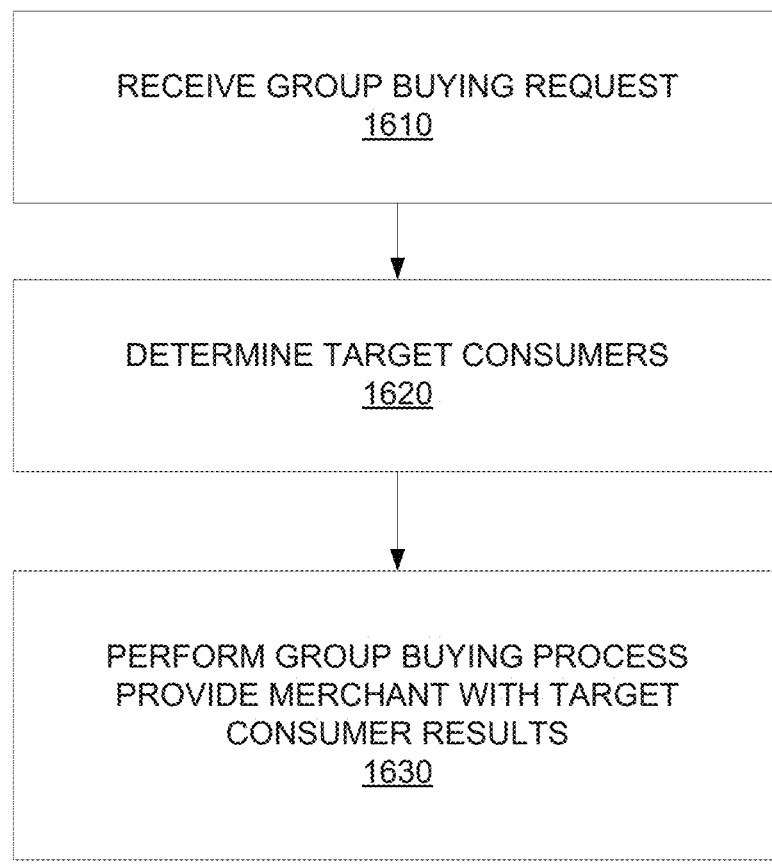
FIG. 16 is a flowchart of an exemplary group buying process, consistent with disclosed embodiments.

FIG. 16 shows a flowchart of an exemplary group buying process consistent with disclosed embodiments. In one embodiment, a social discovery service system consistent with disclosed embodiments (e.g., 130, 170, 510) may receive a group buying request from a user (e.g., step 1610). In response, the social discovery service system may determine one or more target consumers (e.g., other registered users) who may be interested in participating in the group buying effort (e.g., step 1620). The social discovery service system may perform a group buying process based on the determination (e.g., step 1630). For example, the social discovery service system may receive a request to form a group of buyers for particular product in an attempt to receive a discount or other incentive on the product (e.g., a bicycle, a television, a smart phone, grocery item, etc.). The social discovery service system may analyze social discovery profile data, social discovery graphs, etc. relating to other registered users to identify other users who may have an interest in purchasing the identified product. Based on the results of the analysis (e.g., twenty-five people identified who may have an interest), the social discovery service system may generate and provide requests to the identified other users to determine whether they would like to participate in a group buying option for the identified product. The message may be provided to client 150 associated with each user.

If a certain number of users respond that they are interested (e.g., certain percentage, etc.), the social discovery service system may identify one or more merchants who provide the identified product through social discovery profiles, social discovery graphs, transaction data, product data, etc. associated with registered merchants of the social discovery service. The social discovery service system may generate a merchant based group buying request that requests a certain discount on the product. The social discovery service system may provide the group buying request to the identified one or more merchants (via associated merchants systems 160A). The merchant(s) via merchant system 160 may provide an indication that they agree or disagree with the requested group buying request. The indication may be provided to the social discovery service system or may be provided directly to each of the users in the group buying social discovery graph.

As described above, the disclosed embodiments include processes and systems that provide a social discovery service that may provide social discovery operations based on purchase transaction data, product data, location data, and other shopping characteristics of users. The disclosed embodiments include memory that stores transaction data, product data, and/or location data relating to purchase transactions involving users and merchants. Exemplary memory may store this information in data structures that may be usable by processing components of the disclosed embodiments to perform social discovery operations and other operations consistent with the disclosed embodiments. In one example, the memory may be memory included in financial service provider 110. The memory may also be a memory included in a social discovery service system (e.g., system 130, 170, 510). The memory may be memory in other components of systems 100, 200A, 200B, 400, 500.

The social discovery profiles, social discovery graphs, social communities, consumption profiles, and other social discovery relationships consistent with the disclosed embodiments are not limited to the configuration, relationships, formats, and types exemplified above. Instead, the disclosed embodiments may be configured to generate, edit, update, store, and/or modify social discovery relationships in different formats or configurations without departing from the scope of the exemplary embodiments disclosed herein.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims.

For example, the disclosed embodiments may include systems and methods that enable users to discover other users based on each other's social discovery graph (e.g., spend graphs for each user). In one example, a social discovery service system consistent with disclosed embodiments (e.g., 130, 170, 510) may provide interface(s) that enable a user (e.g., user 152A) to search for and identify other user(s) that have similar characteristics, such as similar spending traits. The exemplary interface(s) may provide search input mechanism(s) that allow the user (e.g., user 152A) to select or input one or more traits. In response to the input, the social discovery service system may analyze the social discovery graphs stored in memory and identify one or more users that meet the search criteria (e.g., user 152B). The social discovery service system may generate and provide interface(s) (or other notifications or communication message(s)) that provide the results to the requesting user (e.g., user 152A) that identify the other user(s) (e.g., user 152A). In certain aspects, the result interface(s) may include the other user(s) contact information (e.g., email, phone numbers, etc.). Users registered with the social discovery service system may control what information is provided to other users using the system in this manner (e.g., user 152A may register his account such that only an email is provided to other user's of social discovery service system).

The disclosed embodiments may also provide systems and methods for providing a social discovery subnetwork that interfaces with existing social network services (e.g., Facebook®, LinkedIn®, Yelp®, etc.). In these embodiments, users of existing social networks (e.g., Facebook®, LinkedIn®, Yelp®, etc.) may select and use social discovery service features consistent with the disclosed embodiments through a module or similar feature that is integrated with the existing social network system and interfaces. For example, a user of a social network service (e.g., Facebook®) may select an option (e.g., a social discovery service subnetwork option) presented on the interface for that social network (e.g., on the user's home page, such as a Facebook®, page) to perform analysis and searches similar to those described in connection with the social discovery service operations consistent with disclosed embodiments (e.g., provided by systems 130, 170, 510). In certain aspects, the system(s) providing the existing social network service (e.g., Facebook®, LinkedIn®, Yelp®, etc.) may be configured to perform one or more operations of the social discovery service system(s) disclosed herein (e.g., may execute software that performs similar operations). Alternatively, or in addition, the existing social network service (e.g., Facebook®, LinkedIn®, Yelp®, etc.) may be configured to direct requests to perform social discovery service operations via options on the existing social network's webpage (e.g., home page for a user, etc.) to a social discovery service system consistent with disclosed embodiments (e.g., 130, 170, 510). The social discovery service system may perform operations consistent with those disclosed above. In one aspect, the social discovery service system may process requests and provide results to the existing social network service (e.g., Facebook®, LinkedIn®, Yelp®, etc.) for presentation to the requesting user via the user's home page or interface(s) provided by the existing social network service (e.g., Facebook®, LinkedIn®, Yelp®, etc.).

Moreover, one or more processes associated with the disclosed embodiments may be performed by one or more processors executing software instructions. Some operations may be performed by a computing system(s) included with a social discovery service system, financial service provider, social discovery service provider, merchant system, client, or a combination of these components. The disclosed embodiments may provide a social discovery service through one or more servers that are configured to execute software instructions to provide one or more online portals (e.g., website, etc.) that are accessible using known Internet or other network related communication mechanisms and protocols. Moreover, the interfaces associated with the disclosed embodiments may be generated and provided by a server that is configured to generate web-based other types of interfaces that include content, hyperlinks, and the like, known to one of ordinary skill in the art. The interfaces associated with the disclosed embodiments may be displayed via on a display device included in a computing system associated with one or more of the social network discovery system, financial service provider, merchants, or client systems disclosed herein. The components that receive and display the interfaces associated with the disclosed embodiments may be rendered by software instructions executed by one or more processors configured to generate and display such interfaces, as is known to those skilled in the art (e.g., browser software, mobile device display software, etc.)

Further, the disclosed embodiments may be agnostic to underlying communication technology, including but not limited to: website or any other online service, chat room, email, instant messaging service, text messaging, voice messaging, etc. Thus, for example, the disclosed embodiments may provide social discovery service operations consistent with disclosed embodiments through email communications, webpage interfaces, portals, SMS, online discussion forums, etc.

The disclosed embodiments may provide social discovery between all combinations of consumers and businesses (e.g., small businesses, advertisers, retailers, product manufacturers, service providers, etc.). For example, a social discovery service system consistent with disclosed embodiments (e.g., 130, 170, 510) may process social discovery service requests for individuals regarding business entities, or for representatives of business entities regarding other business entities or individuals. For instance, the disclosed embodiments may provide P2P social discovery (e.g., relevant recommendations, reviews). For example, referring to FIG. 8, user 811 may recommend merchant M1 for user 812. The disclosed embodiments may also provide B2B social discovery (e.g., business partnership opportunities). For example, again referring to FIG. 8, merchant M2 may contact and form a business relationship with merchant M3 using the social discovery services provided by the disclosed embodiments. One skilled in the art will understand that processes performed by a merchant may be through one or more user representatives of that merchant. The disclosed embodiments may also provide B2C/C2B (business-to-customer/customer-to-business) social discovery (e.g., targeted offers, employment opportunities). For example, again referring to FIG. 8, user 813 may receive a targeted offer from merchant M3 and respond to the offer through the social discovery service system (e.g., system 130, 170, 510). As another example, user 813 may seek employment with a merchant (e.g., merchant M2) or business associated with a certain product brand that user 813 actively purchases from or receives offers through the social discovery service mechanisms of the disclosed embodiments. In general, the social discovery service features of the disclosed embodiments may provide any one or two-way communication between consumers and businesses registered with the social discovery service.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A computer-implemented method for providing social discovery service operations via a social networking portal, comprising:
    receiving, by one or more processors of the social networking portal, transaction data relating to a plurality of financial transactions associated with a plurality of users, at least one of the financial transactions involving an online transaction;
    receiving, by the one or more processors, product data identifying one or more products included in the financial transactions, the product data comprising stock keeping unit (SKU) data associated with the one or more products;
    receiving Global Positioning System (GPS) location data of one or more electronic devices associated with the plurality of users and associated with the financial transactions;
    determining, based at least in part on the transaction data, a level of trust between a user and the plurality of users;
    generating, by the one or more processors, a social discovery profile for the plurality of users based on the transaction data, the location data, and the product data, the social discovery profile reflecting shopping characteristics of the user in relation to shopping characteristics of the plurality of users and the level of trust;
    receiving, from the user, a request for a crowdfunding event, the request including a crowdfunding parameter;
    identifying, from the plurality of users, potential crowdfunding participants to participate in the crowdfunding event based on the location data, the crowdfunding parameter, the shopping characteristics, and the level of trust;
    notifying the user requesting crowdfunding of the potential crowdfunding participants;
    receiving instructions, from the user requesting crowdfunding, to provide an offer notification to the potential crowdfunding participants; and
    transmitting the offer notification to the potential crowdfunding participants.

2. The computer-implemented method of claim 1, further comprising:
    generating, based on the social discovery profiles, a social discovery graph reflecting characteristics of the user in relation to characteristics of one or more of the plurality of users.

3. The computer-implemented method of claim 2, wherein identifying potential crowdfunding participants is further based on the social discovery graph.

4. The computer-implemented method of claim 1, wherein identifying potential crowdfunding participants is further based on consumption patterns of the plurality of users.

5. The computer-implemented method of claim 1, wherein the crowdfunding parameter comprises at least one of a product, a characteristic, a habit, a consumption pattern, or a trait.

6. A system for providing a social discovery service, comprising:
    a social networking portal comprising one or more memory devices storing software instructions, and one or more processors configured to execute the software instructions to:
        receive transaction data relating to a plurality of financial transactions associated with a plurality of users, at least one of the financial transactions involving an online transaction;
        receive product data identifying one or more products included in the financial transactions, the product data comprising stock keeping unit (SKU) data associated with the one or more products;
        receive Global Positioning System (GPS) location data of one or more electronic devices associated with the plurality of users and associated with the financial transactions;
        determine, based at least in part on the transaction data, a level of trust between a user and the plurality of users;
        generate a social discovery profile for the plurality of users based on the transaction data, the location data, and the product data, the social discovery profile reflecting shopping characteristics of the user in relation to shopping characteristics of the plurality of users and the level of trust;
        receive, from the user, a request for a crowdfunding event, the request including a crowdfunding parameter;
        identify, from the plurality of users, potential crowdfunding participants to participate in the crowdfunding event based on the location data, the crowdfunding parameter, the shopping characteristics, and the level of trust;
        notify the user requesting crowdfunding of the potential crowdfunding participants;
        receive instructions, from the user requesting crowdfunding, to provide an offer notification to the potential crowdfunding participants; and
        transmit the offer notification to the potential crowdfunding participants.

7. The system of claim 6, wherein the processors are further configured to execute the software instructions to:

generate, based on the social discovery profiles, a social discovery graph reflecting characteristics of the user in relation to characteristics of one or more of the plurality of users.

8. The system of claim 7, wherein identifying potential crowdfunding participants is further based on the social discovery graph.

9. The system of claim 6, wherein identifying potential crowdfunding participants is further based on consumption patterns of the plurality of users.

10. The system of claim 6, wherein the crowdfunding parameter comprises at least one of a product, a characteristic, a habit, a consumption pattern, or a trait.

11. A computer-implemented method for providing social discovery service operations via a social networking portal, comprising:

receiving, by one or more processors of the social networking portal, transaction data relating to a plurality of financial transactions associated with a plurality of users, at least one of the financial transactions involving an online transaction;

receiving, by the one or more processors, product data identifying one or more products included in the financial transactions, the product data comprising stock keeping unit (SKU) data associated with the one or more products;

receiving Global Positioning System (GPS) location data of one or more electronic devices associated with the plurality of users and associated with the financial transactions;

determining, based at least in part on the transaction data, a level of trust between a user and the plurality of users;

generating, by the one or more processors, a social discovery profile for the plurality of users based on the transaction data, the location data, and the product data, the social discovery profile reflecting shopping characteristics of the user in relation to shopping characteristics of the plurality of users and the level of trust;

receiving, from the user, a request for a crowdfunding event, the request comprising crowdfunding parameters associated with the crowdfunding event;

analyzing the social discovery profiles to identify, from the plurality of users, potential crowdfunding participants to participate in the crowdfunding event, based on the crowdfunding parameters, the shopping characteristics, and the level of trust;

notifying the user requesting crowdfunding of the potential crowdfunding participants;

receiving instructions, from the user requesting crowdfunding, to provide an offer notification to the potential crowdfunding participants; and transmitting the offer notification to the potential crowdfunding participants.

12. The computer-implemented method of claim 11, further comprising:

generating, based on the social discovery profiles, a social discovery graph reflecting characteristics of the user in relation to other users;

wherein identifying potential crowdfunding participants comprises identifying the potential crowdfunding participants based on the social discovery graph.

* * * * *